US012651718B2

(12) United States Patent
Yoo

(10) Patent No.: US 12,651,718 B2
(45) Date of Patent: Jun. 9, 2026

(54) MOVABLE CONTACT PART AND DC RELAY INCLUDING SAME

(71) Applicant: LS ELECTRIC CO., LTD., Anyang-si (KR)

(72) Inventor: Jung Woo Yoo, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 196 days.

(21) Appl. No.: 18/028,721

(22) PCT Filed: Jul. 2, 2021

(86) PCT No.: PCT/KR2021/008413
§ 371 (c)(1),
(2) Date: Mar. 27, 2023

(87) PCT Pub. No.: WO2022/065638
PCT Pub. Date: Mar. 31, 2022

(65) Prior Publication Data

US 2023/0335363 A1 Oct. 19, 2023

(30) Foreign Application Priority Data

Sep. 25, 2020 (KR) ........................ 10-2020-0124939

(51) Int. Cl.
*H01H 50/18* (2006.01)
*H01H 33/59* (2006.01)
*H01H 50/36* (2006.01)

(52) U.S. Cl.
CPC ........... *H01H 50/18* (2013.01); *H01H 33/596* (2013.01); *H01H 50/36* (2013.01)

(58) Field of Classification Search
CPC ...................................................... H01H 50/18
(Continued)

(56) References Cited

U.S. PATENT DOCUMENTS 3,215,800 A * 11/1965 Hurter .................. H01H 50/545 335/131
8,138,872 B2 * 3/2012 Yoshihara .............. H01H 50/36 335/185
(Continued)

FOREIGN PATENT DOCUMENTS

JP 2003016902 A 1/2003
JP 2019083171 A 5/2019
(Continued)

OTHER PUBLICATIONS

International Search Report for related International Application No. PCT/KR2021/008413; action dated Mar. 31, 2022; (5 pages).
(Continued)

*Primary Examiner* — Alexander Talpalatski
(74) *Attorney, Agent, or Firm* — K&L Gates LLP

(57) ABSTRACT

Disclosed are a movable contact part and a direct current relay including the same. The movable contact part according to an embodiment of the present disclosure includes an upper holder and a lower holder. One holder among the upper holder and the lower holder has a coupling protrusion that protrudes toward the other holder. The other holder among the upper holder and the lower holder has a coupling groove into which the coupling protrusion is inserted and coupled. The lower holder is coupled to the inside of a housing, and the upper holder is coupled to each of the lower holder and the housing. Accordingly, the coupling between the upper holder and the lower holder is facilitated, and the coupled state can be stably maintained.

6 Claims, 24 Drawing Sheets

(58) Field of Classification Search
USPC .......................................... 335/126, 131, 195
See application file for complete search history.

(56) References Cited

U.S. PATENT DOCUMENTS

| | | | | |
|---|---|---|---|---|
| 9,269,507 | B2 * | 2/2016 | Enomoto | H01H 1/54 |
| 9,514,897 | B2 * | 12/2016 | Yeom | H05K 1/181 |
| 9,640,355 | B2 | 5/2017 | Enomoto et al. | |
| 9,799,474 | B2 * | 10/2017 | Sakai | H01H 45/04 |
| 11,139,132 | B2 * | 10/2021 | Kroeker | H01H 50/026 |
| 11,735,386 | B2 * | 8/2023 | Zhou | H01H 50/045 335/195 |
| 2019/0006140 | A1 * | 1/2019 | Shi | H01H 50/546 |
| 2019/0148095 | A1 * | 5/2019 | Minowa | H01H 50/14 335/185 |
| 2019/0287747 | A1 * | 9/2019 | Kroeker | H01H 50/026 |
| 2019/0304727 | A1 | 10/2019 | Minowa et al. | |
| 2020/0373111 | A1 * | 11/2020 | Zhong | H01H 50/02 |
| 2023/0090245 | A1 * | 3/2023 | Zhong | H01H 50/18 335/185 |

FOREIGN PATENT DOCUMENTS

| | | |
|---|---|---|
| KR | 1020200000312 | 1/2020 |
| KR | 1020200045324 | 5/2020 |
| KR | 1020200096195 | 8/2020 |

OTHER PUBLICATIONS

Written Opinion for related International Application No. PCT/KR2021/008413; action dated Mar. 31, 2022; (6 pages).

* cited by examiner

MOVABLE CONTACT PART AND DC RELAY INCLUDING SAME

CROSS-REFERENCE TO RELATED APPLICATION

The present application is a National Stage of International Application No. PCT/KR2021/008413 filed on Jul. 2, 2021, which claims priority to and the benefit of Korean Utility Model Application No. 10-2020-0124939, filed Sep. 25, 2020, the disclosures of which are incorporated herein by reference in its entirety.

FIELD

The present disclosure relates to a movable contact part and a direct current relay including the same, and more particularly, to a movable contact part that can be easily and firmly manufactured and a direct current relay including the same.

BACKGROUND

A direct current relay is a device that transmits a mechanical drive or current signal using the principle of an electromagnet. The direct current relay is also called an electromagnetic switch, and is generally classified as an electrical circuit switching device.

The direct current relay may be operated by receiving external control power. The direct current relay includes a stationary core and a movable core that can be magnetized by a control power. The stationary core and the movable core are positioned adjacent to a bobbin around which a plurality of coils are wound.

When the control power is applied, the plurality of coils form an electromagnetic field. The stationary core and the movable core are magnetized by the electromagnetic field so that an electromagnetic attraction force is generated between the stationary core and the movable core.

Since the stationary core is fixed, the movable core is moved toward the stationary core. One side of a shaft member is connected to the movable core. Further, the other side of the shaft member is connected to the movable contact.

When the movable core is moved toward the stationary core, the shaft and the movable contact connected to the shaft are also moved. By the movement, the movable contact may be moved towards the fixed contact. When the movable contact and the fixed contact come into contact, the direct current relay conducts electric current with an external power source and load.

In this case, the movable contact is surrounded by a housing or the like to prevent any electric current with the outside and to prevent damage caused by external foreign substances or the like.

In the direct current relay according to the related art, the housing is formed of different materials. Each component of different materials is coupled by insert injection or the like, and a movable contact is inserted from the side through an opening of the housing and assembled.

However, a member for fixing the inserted movable contact is inserted and coupled in the vertical direction. Therefore, the insertion and fixing directions are different from each other, resulting in complexity in the process of manufacturing a movable contact and a housing surrounding the same.

In addition, since the housing is coupled by insert injection, when an assembly error occurs, it is difficult to correct the error. Furthermore, since the housing is coupled at a single location, it is difficult to stably maintain the coupled state of the housing.

Korean Patent Laid-Open Publication No. 10-2020-0025805 discloses a direct current relay having a mover assembly with improved support for a movable contact. Specifically, disclosed is a direct current relay having a structure capable of maintaining a coupled state between a movable contact and a mover holder by providing a support pin for connecting and supporting the movable contact and the mover holder.

However, the above prior art document does not suggest a method for easily and firmly manufacturing the mover holder. That is, the above prior art document mainly focuses on a method for maintaining the coupled state of the movable contact and the mover holder, and does not disclose the contents related to the manufacturing of the mover holder itself.

Korean Patent Laid-Open Publication No. 10-2020-0096195 discloses a direct current relay having a mover assembly with improved contact pressure. Specifically, disclosed is a direct current relay having a structure in which a contact pressure spring is provided between a lower yoke and a mover support to improve contact pressure according to movement of a movable core and a shaft.

However, the above prior art document also does not suggest a method for easily and firmly manufacturing the mover holder. That is, the above prior art document only suggests a method for effectively interlocking the movement of the movable core and the shaft and the movement of the mover, but does not disclose the contents related to the manufacturing of the mover holder itself (Patent Document 1) Korean Patent Laid-Open Publication No. 10-2020-0025805 (2020.03.10.)

(Patent Document 2) Korean Patent Laid-Open Publication No. 10-2020-0096195 (2020.08.11.)

SUMMARY

The present disclosure is directed to providing a movable contact part having a structure capable of solving the above problems and a direct current relay including the same.

First, the present disclosure is directed to providing a movable contact part having a structure in which coupling of a member surrounding a movable contact is easy, and a direct current relay including the same.

In addition, the present disclosure is directed to providing a movable contact part having a structure in which a member surrounding a movable contact can be coupled at a plurality of positions, and a direct current relay including the same.

In addition, the present disclosure is directed to providing a movable contact part having a structure in which the coupling state between members surrounding the movable contact can be stably maintained, and a direct current relay including the same.

In addition, the present disclosure is directed to providing a movable contact part having a structure capable of improving the coupling accuracy of a movable contact and a member surrounding the movable contact, and a direct current relay including the same.

First, the present disclosure is directed to providing a movable contact part having a structure capable of improving the degree of design freedom of a member surrounding the movable contact, and a direct current relay including the same.

To achieve the above objects, the present disclosure includes a movable contact part, comprising: a movable contact; an upper holder surrounding the movable contact at one side; a housing positioned to face the upper holder with the movable contact interposed therebetween, and surrounding the movable contact at the other side; and a lower holder located inside the housing, partially exposed to the outside of the housing and coupled to the upper holder; wherein one of the upper holder and the lower holder is provided with a coupling protrusion protruding toward the other one of the upper holder and the lower holder, and a coupling groove accommodating the coupling protrusion is formed in the other one of the upper holder and the lower holder.

In addition, the upper holder of the movable contact part may include a base surrounding the movable contact at one side and extending in one direction; and a coupling part that is continuous with the base, extends toward the lower holder, and has the coupling groove formed therein; and the lower holder may include a flat plate part located inside the housing, extending in the one direction, and having the coupling protrusion formed at an end in the one direction.

In addition, the coupling part of the movable contact part may be provided in plurality, and the plurality of coupling portions may be continuous with each end of the base in the one direction, respectively, the coupling groove may be formed in each of the plurality of coupling parts, and the coupling protrusion may be provided in plurality, each located at each end of the flat plate part in the one direction.

In addition, each of the coupling grooves provided in the plurality of coupling parts of the movable contact part may be provided in plurality, the coupling protrusions located at each end of the flat plate part in the one direction may be provided in plurality, and the plurality of coupling protrusions positioned at any one end of each end of the flat plate part in the one direction may be coupled to the plurality of coupling grooves provided in any one coupling part of the plurality of the coupling parts.

In addition, the coupling part of the movable contact part may be formed to have a width in the other direction, the plurality of the coupling grooves provided in any one coupling part of the plurality of coupling parts may be spaced apart from each other in the other direction, and the plurality of coupling protrusions located at any one end of each end of the flat plate part in the one direction may be spaced apart from each other in the other direction.

In addition, the plurality of the coupling grooves located in any one coupling part of the plurality of coupling parts of the movable contact part may be spaced apart from each other in a direction toward the base and in a direction opposite to the base, and the plurality of coupling protrusions located at any one end of each end of the flat plate part in the one direction may be spaced apart from each other in a direction toward the base and in a direction opposite to the base.

In addition, the coupling part of the movable contact part may be formed to have a width in the other direction, the plurality of the coupling grooves provided in any one coupling part of the plurality of coupling parts may be spaced apart from each other inclined in the other direction, and the plurality of coupling protrusions located at any one end of each end of the flat plate part in the one direction may be spaced apart from each other inclined in the other direction.

In addition, the coupling part of the movable contact part may be formed to have a width in the other direction, and the coupling groove and the coupling protrusion may have a width in the other direction longer than a length in a direction toward the base and a direction opposite to the base.

In addition, the upper holder of the movable contact part may include a base surrounding the movable contact at one side and extending in one direction; and a coupling part that is continuous with the base, extends toward the lower holder, and has the coupling protrusion; and the lower holder may include a flat plate part located inside the housing, extending in the one direction, and having the coupling groove formed recessed at an end in the one direction in a direction opposite to the coupling part.

In addition, the housing of the movable contact part may include a groove formed recessed on a surface facing the coupling part, and communicating with an inner space in which the lower holder is accommodated and the outside of the housing, respectively, and the coupling groove may communicate with the groove of the housing so that the coupling protrusion is inserted into the groove of the housing and the coupling groove.

In addition, the upper holder of the movable contact part may include a base surrounding the movable contact at one side and extending in one direction; and a coupling part that is continuous with the base, extends toward the lower holder, has one of the coupling protrusion and the coupling groove, and has a width in the other direction; and the housing may include a body part accommodating the lower holder; a plurality of arm parts located on one side facing the coupling part, connected to the body part, and spaced apart from each other in the other direction; and a coupling space part formed surrounded by the body part and the plurality of arm parts and accommodating the coupling part.

In addition, the plurality of arm parts of the movable contact part may be spaced apart by a length equal to the length of the width of the coupling part, and each end in the other direction of the coupling part accommodated in the coupling space part may be supported by the plurality of arm parts.

In addition, the upper holder of the movable contact part may include a base surrounding the movable contact at one side and extending in one direction; a connection part located at each end of the base in the one direction and extending toward the lower holder; a cushioning part that is continuous with the connection part and comprises a plurality of bent parts; and a coupling part that is continuous with the cushioning part, extends toward the lower holder, and has the coupling groove formed therein; and the lower holder may include a flat plate part located inside the housing, extending in the one direction, and having the coupling protrusion formed at an end in the one direction.

In addition, the present disclosure provides a movable contact part, including: a movable contact;

an upper holder that surrounds the movable contact at one side and is formed of a material having elasticity; a housing positioned to face the upper holder with the movable contact interposed therebetween, and surrounding the movable contact at the other side; and a lower holder located inside the housing, partially exposed to the outside of the housing and coupled to the upper holder; wherein the upper holder includes a base surrounding one side of the housing; a connection part that is continuous with the base and extends toward the lower holder; a cushioning part that is continuous with the connection part and extends toward the lower holder; and a coupling part that is continuous with the cushioning part and is coupled to the lower holder.

In addition, the cushioning part of the movable contact part may include a first bent part extending in a direction opposite to the movable contact at a predetermined angle with the connection part; a second bent part extending toward the lower holder at a predetermined angle with the first bent part; and a third bent part extending toward the movable contact at a predetermined angle with the second bent part.

In addition, the cushioning part of the movable contact part may be formed in a concave-convex shape with a cross-section formed convexly in a direction opposite to the movable contact.

In addition, the present disclosure provides a direct current relay, including: a fixed contact electrically connected to an external power source or load; a movable contact positioned below the fixed contact and coming into contact with and spaced apart from the fixed contact; an upper holder positioned between the movable contact and the fixed contact and surrounding an upper side of the movable contact; a housing located below the movable contact and surrounding the lower side of the movable contact; and a lower holder located inside the housing, partially exposed to the outside of the housing and coupled to the upper holder; wherein one of the upper holder and the lower holder is provided with a coupling protrusion protruding toward the other one of the upper holder and the lower holder, and a coupling groove accommodating the coupling protrusion is formed in the other one of the upper holder and the lower holder.

In addition, the upper holder of the direct current relay may include a base surrounding the movable contact from an upper side and extending in one direction; and a coupling part that is continuous with the base, extends toward the lower holder, and has the coupling groove formed therein; and the lower holder may include a flat plate part located inside the housing, extending in the one direction, and having the coupling protrusion formed at an end in the one direction.

In addition, the upper holder of the direct current relay may include a base surrounding the movable contact from an upper side and extending in one direction; and a coupling part that is continuous with the base, extends toward the lower holder, and has the coupling protrusion formed therein extending toward the lower holder; and the lower holder may include a flat plate part located inside the housing, extending in the one direction, and having the coupling groove formed recessed at an end of the one direction in a direction opposite to the coupling part.

In addition, the upper holder of the direct current relay may include a base surrounding the movable contact from an upper side and extending in one direction; and a coupling part that is continuous with the base, extends toward the lower holder, has one of the coupling protrusion and the coupling groove, and has a width in the other direction; and the housing may include a body part accommodating the lower holder; a plurality of arm parts located on one side facing the coupling part, connected to the body part, and spaced apart from each other by a width of the coupling part in the other direction; and a coupling space part formed surrounded by the body part and the plurality of arm parts and accommodating the coupling part, wherein each end in the other direction of the coupling part accommodated in the coupling space part may be supported by the plurality of arm parts.

According to an embodiment of the present disclosure, the following effects can be achieved.

First, the movable contact part has an upper holder and a lower holder. The upper holder surrounds the movable contact from the upper side. In addition, the lower holder surrounds the movable contact from the lower side. The upper holder includes a coupling part extending toward the lower holder and coupled to the lower holder.

The lower holder is partially accommodated inside the housing. That is, a part of the lower holder is exposed to the outside of the housing. The lower holder and the housing are manufactured by insert injection molding or the like.

A coupling protrusion is formed on one of the upper holder and the lower holder. A coupling groove accommodating the coupling protrusion is formed in the other of the upper holder and the lower holder.

Therefore, after the upper holder is positioned adjacent to the lower holder in a vertical direction, that is, in a direction in which the movable contact is assembled, the coupling protrusion and the coupling groove can be coupled to each other so that the upper holder can be coupled to the lower holder.

Accordingly, the upper holder and the lower holder surrounding the movable contact can be easily coupled.

In addition, the housing includes a body part accommodating the lower holder and an arm part connected to the body part. The arm part is formed to protrude toward the upper holder from a surface of the body part in a direction toward the upper holder. A plurality of arm parts are provided and disposed spaced apart from each other. Accordingly, the coupling space part, which is a space surrounded by the body part and the plurality of arm parts, is defined.

The coupling part of the upper holder is accommodated in the coupling space part. In this case, the plurality of arm parts support each end of the coupling part in the width direction.

Accordingly, the upper holder may be coupled to the housing and the lower holder not only by the combination of the coupling groove and the coupling protrusion, but also by the plurality of arm parts.

In addition, as described above, the upper holder is coupled with the housing and the lower holder at a plurality of points. A plurality of coupling parts of the upper holder are provided and coupled to the housing and the lower holder at different positions.

Accordingly, the upper holder may be not only coupled to the housing and the lower holder at different positions, but also be coupled to the housing and the lower holder at a plurality of points even at the different positions.

Furthermore, the upper holder is made of a material having a predetermined elasticity, so that its shape can be deformed. The upper holder is provided with a continuous cushioning part at different angles. The cushioning part may absorb vibration generated by an external force or movement of the movable contact part.

As a result, the coupling state of the upper holder and the lower holder or housing can be stably maintained.

In addition, through the above configuration, the upper holder and the lower holder are assembled by being moved in the direction in which the movable contact is assembled, that is, in the vertical direction. That is, after the member for surrounding the movable contact is already assembled, the movable contact does not need to be assembled in the lateral direction.

Therefore, after assembling the movable contact by moving it in the vertical direction, it is possible to assemble the lower holder by moving the upper holder in the same direction. Accordingly, assembly convenience and coupling accuracy can be improved.

In addition, the coupling protrusion and the coupling groove may be selectively provided in the upper holder and the lower holder. The coupling protrusion and the coupling groove may be formed in various numbers, positions, and shapes as long as they correspond to each other.

Accordingly, the coupling protrusion and the coupling groove may be formed in various shapes depending on the environment in which the movable contact part and the direct current relay are provided, the operating environment or the like. As a result, the degree of design freedom of the movable contact part and the direct current relay can be improved.

DETAILED DESCRIPTION

Hereinafter, a movable contact part 400 or 500 and a direct current relay 10 including the same according to the embodiment of the present disclosure will be described in detail with reference to the accompanying drawings.

In the following description, in order to clarify the features of the present disclosure, descriptions of some components may be omitted.

1. Term Definition

When an element is referred to as being "connected" or "linked" to other element, it will be understood that it can be directly connected or linked to the other element but intervening elements may also be present.

On the other hand, when an element is referred to as being "directly connected" or "directly linked" to other element, it will be understood that there are no intervening elements present.

As used herein, expressions in the singular include plural expressions unless the context clearly indicates otherwise.

The term "magnetize" used in the following description means a phenomenon in which an object becomes magnetic in a magnetic field.

The term "electric current" used in the following description means a state in which two or more members are electrically connected.

Figure 1:
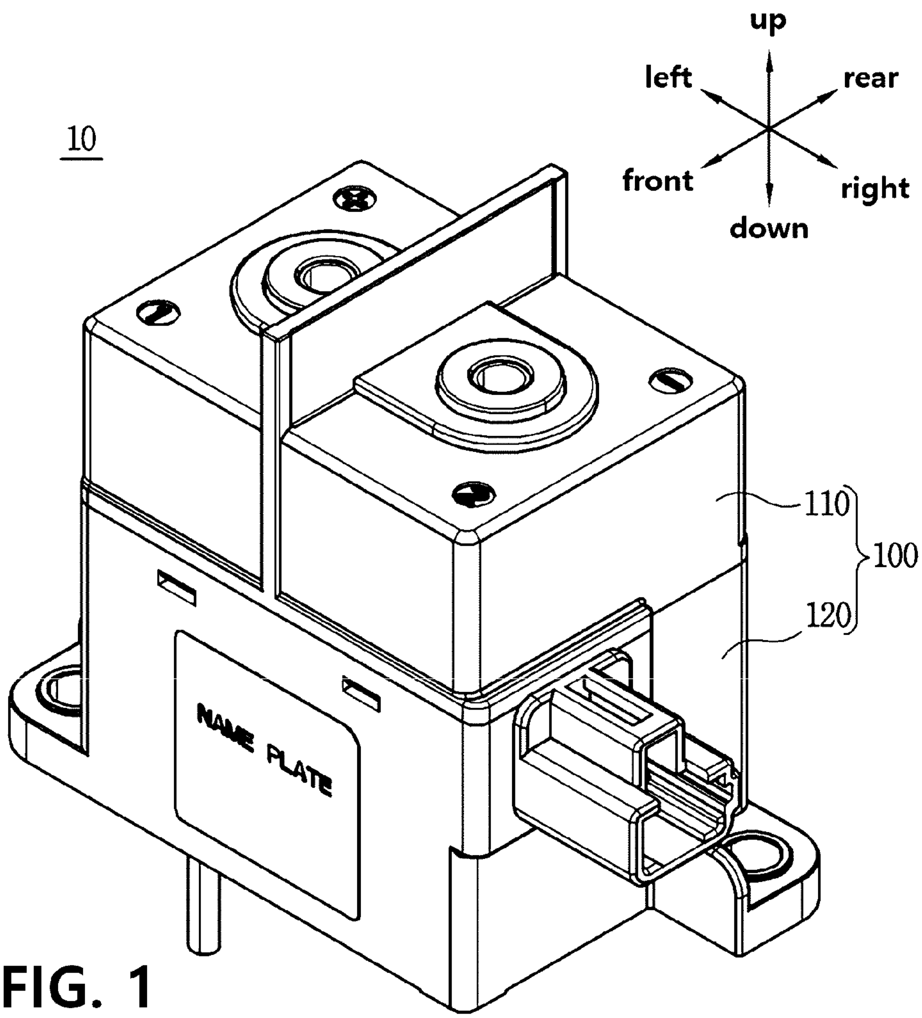
FIG. 1 is a perspective view illustrating a direct current relay according to an exemplary embodiment of the present disclosure.
Figure 4:
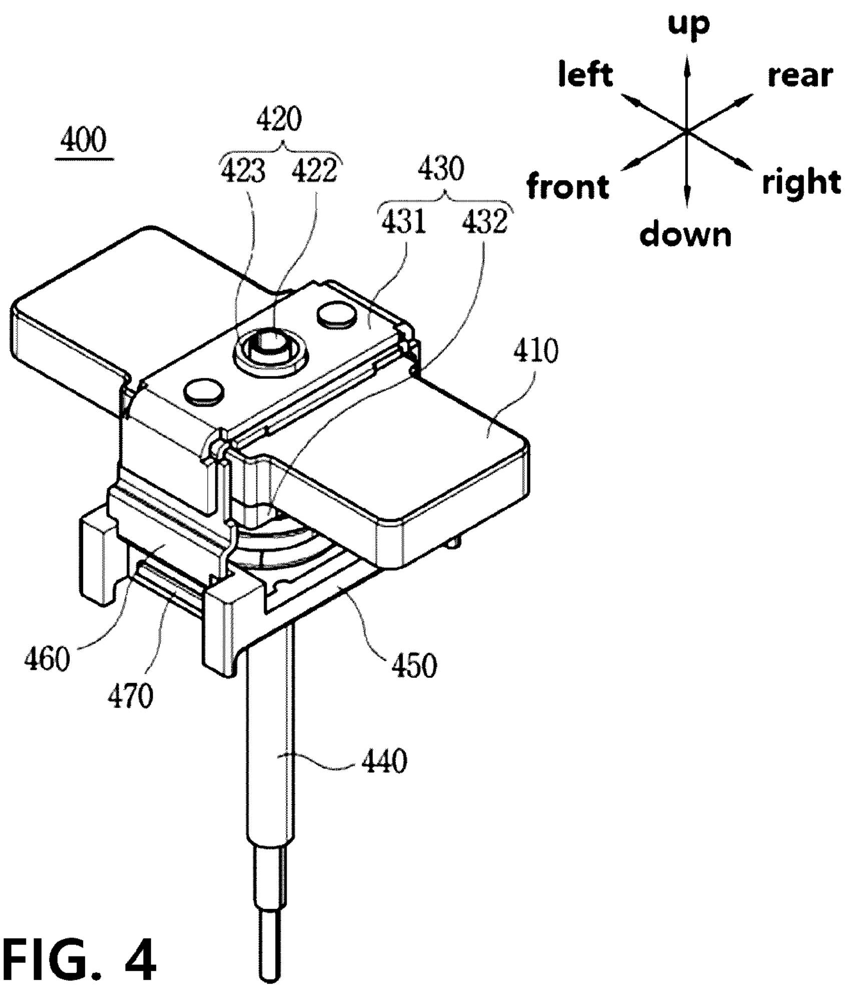
FIG. 4 is a perspective view illustrating a movable contact part provided in the direct current relay of FIG. 1 according to an embodiment of the present disclosure.
Figure 5:
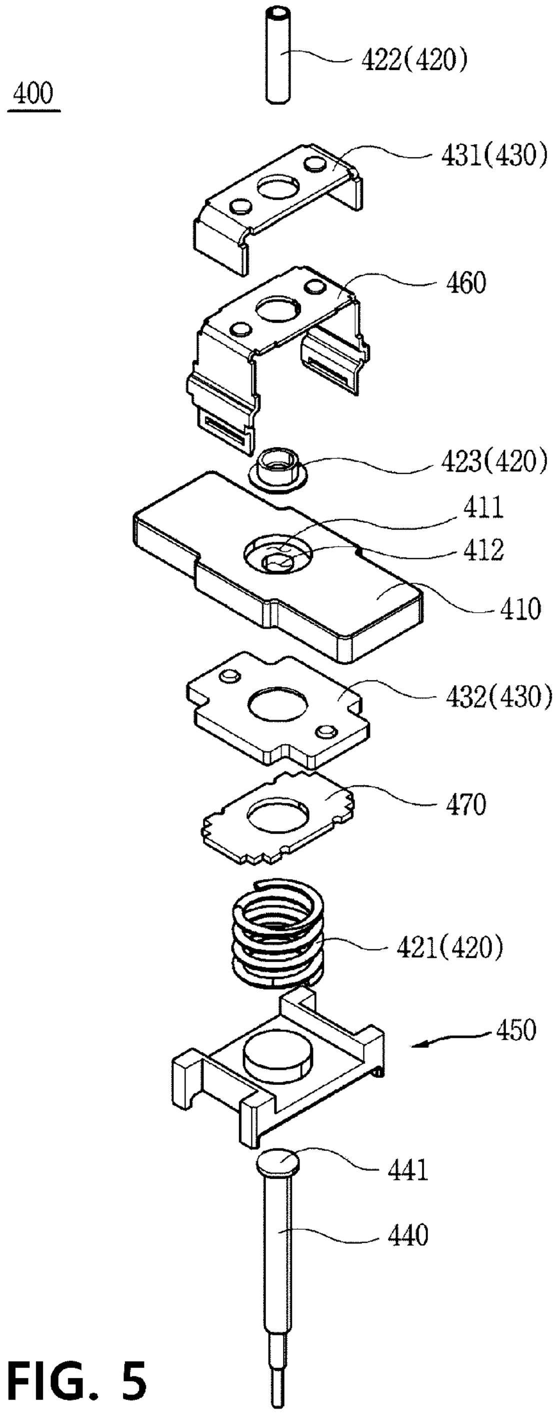
FIG. 5 is an exploded perspective view illustrating a configuration of the movable contact part of FIG. 4.
Figure 6:
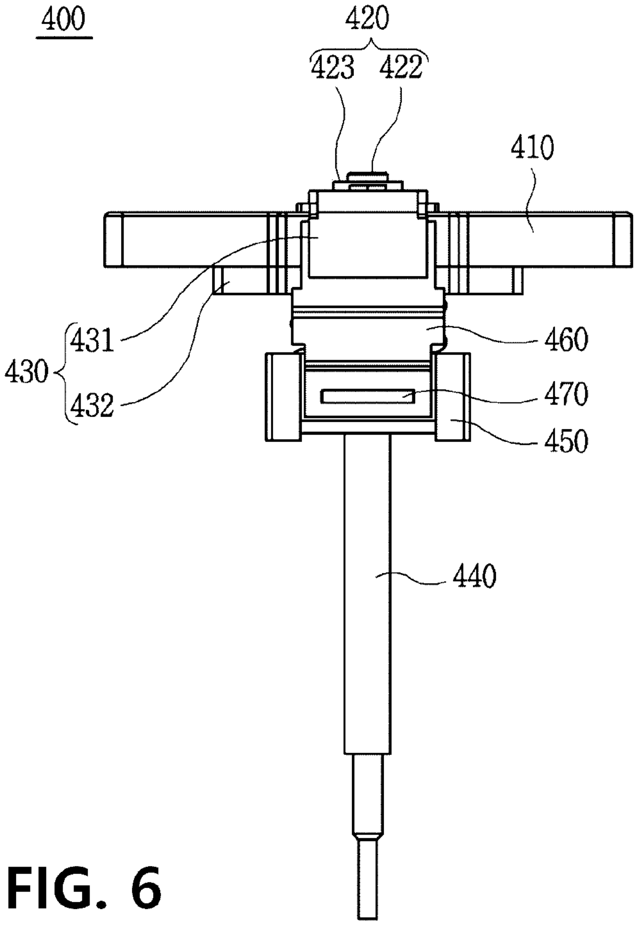
FIG. 6 is a front view illustrating the movable contact part of FIG. 4.
Figure 7:
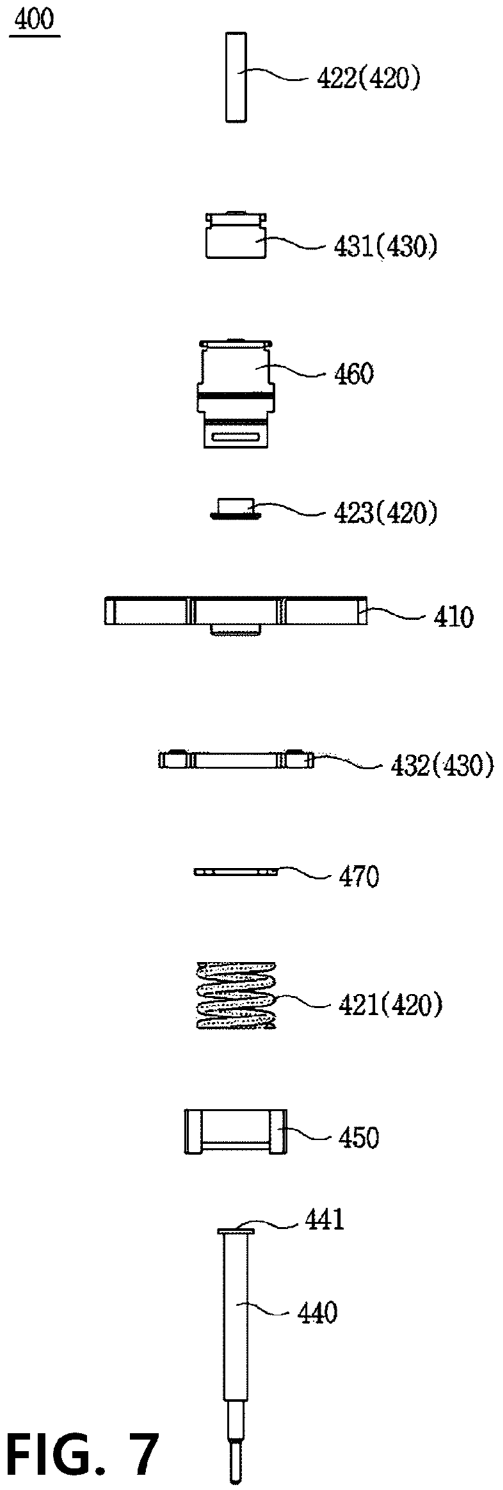
FIG. 7 is an exploded front view illustrating a configuration of the movable contact part of FIG. 4.
Figure 8:
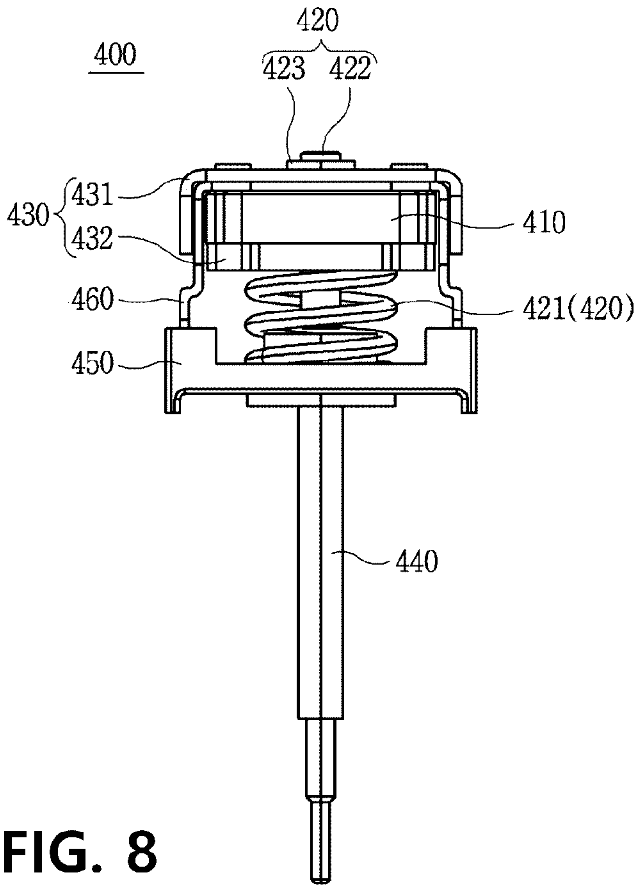
FIG. 8 is a side view illustrating the movable contact part of FIG. 4.
Figure 9:
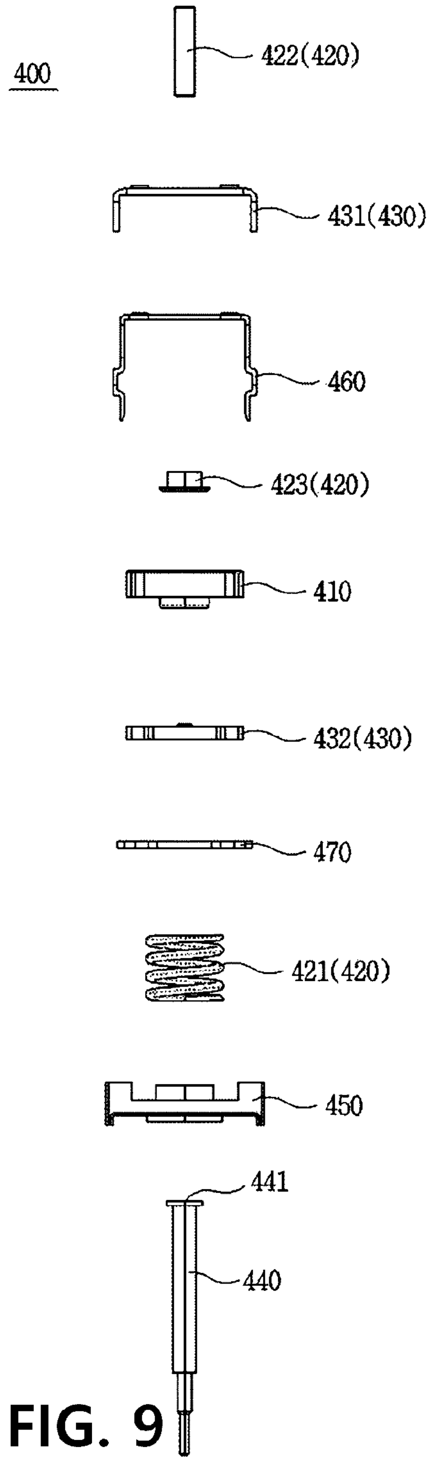
FIG. 9 is an exploded side view illustrating a configuration of the movable contact part of FIG. 4.
Figure 23:
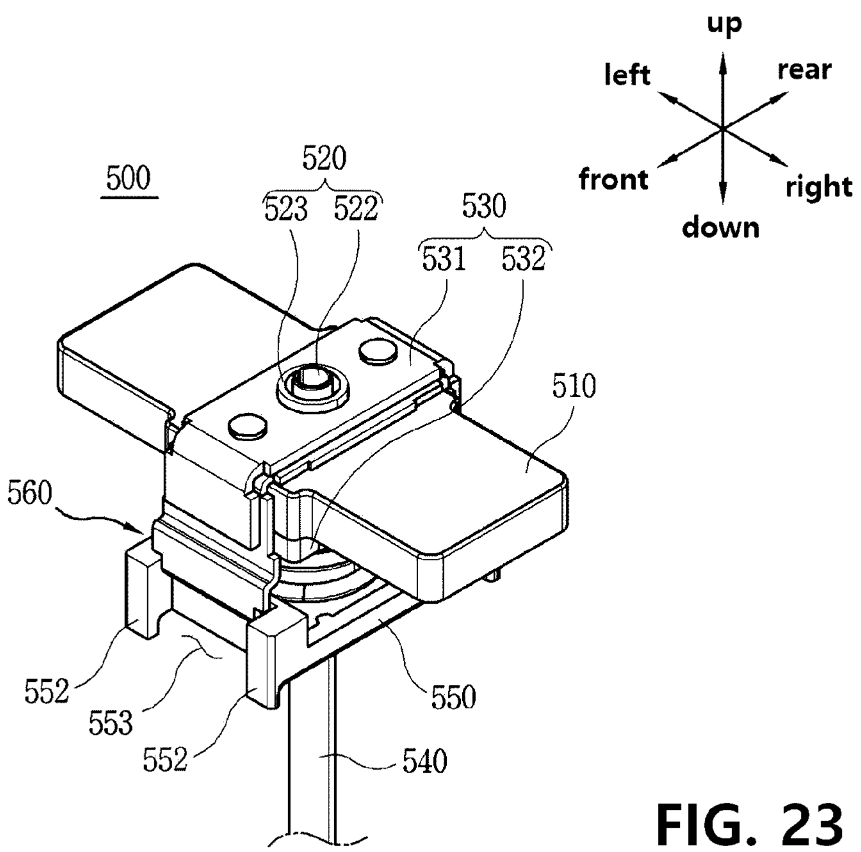
FIG. 23 is a perspective view illustrating a movable contact part according to another exemplary embodiment of the present disclosure.

The terms "left side", "right side", "upper side", "lower side", "front side", and "rear side" used in the following description will be understood with reference to the coordinate system shown in FIGS. 1, 4, and 23.

Figure 2:
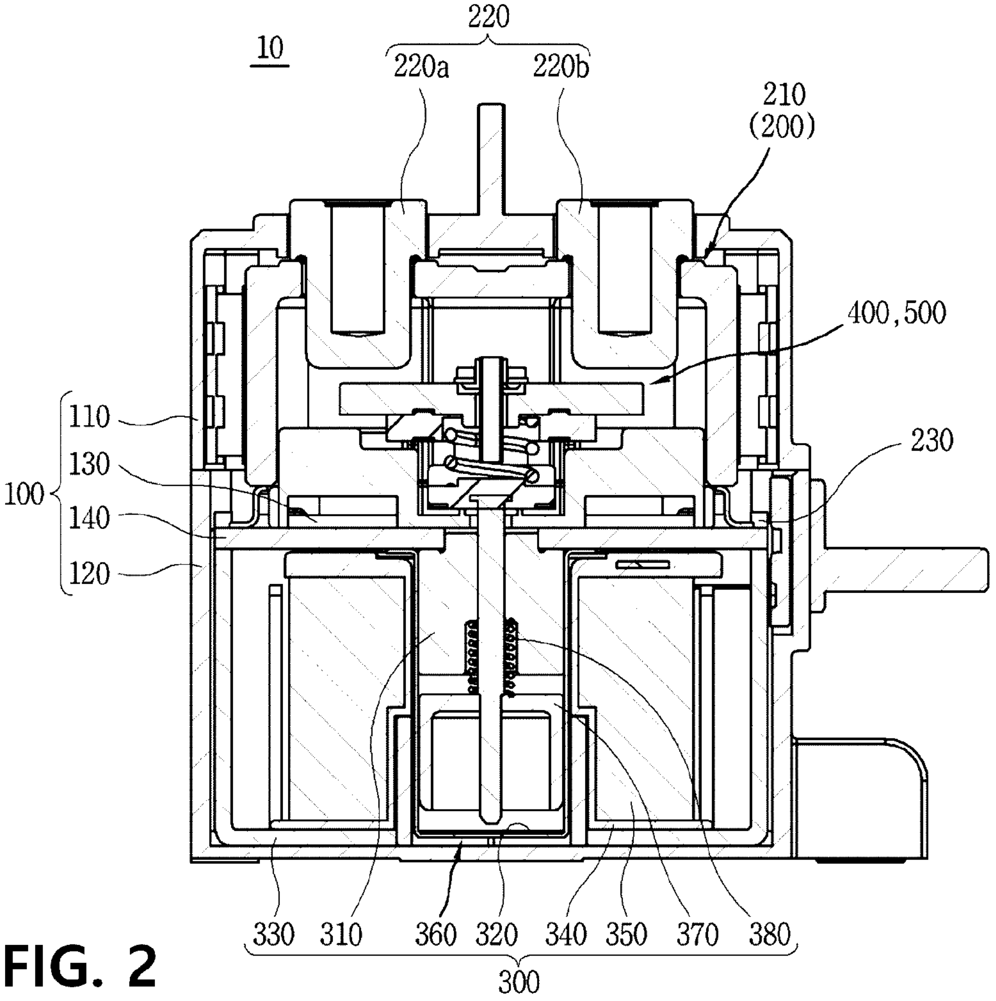
FIG. 2 is a front cross-sectional view illustrating an internal configuration of the direct current relay of FIG. 1.
Figure 3:
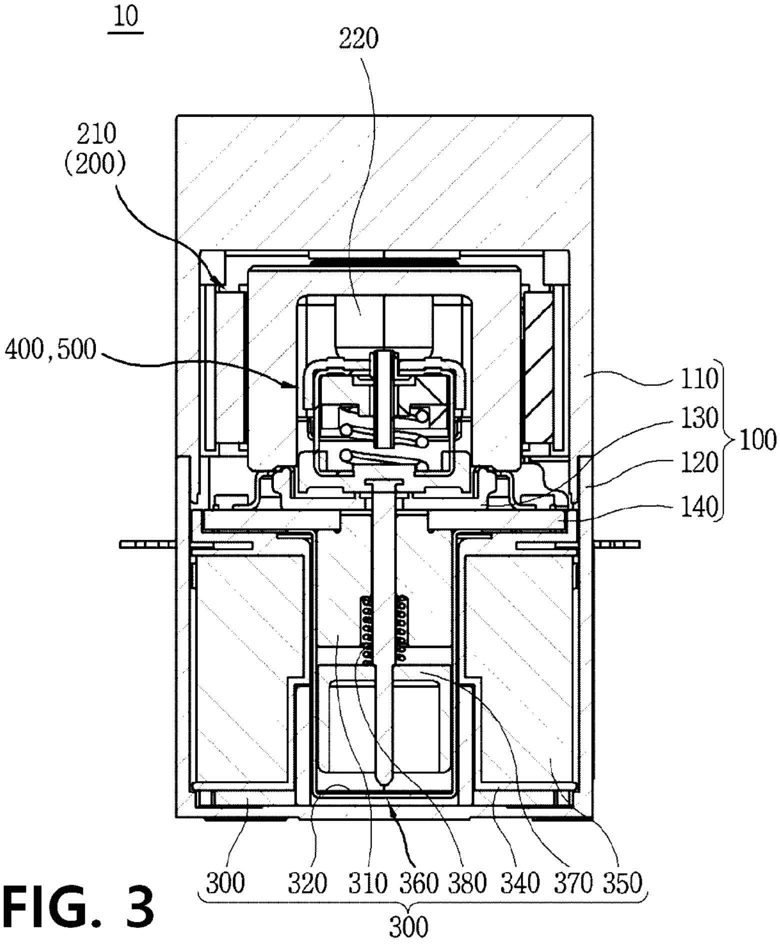
FIG. 3 is a side cross-sectional view illustrating an internal configuration of the direct current relay of FIG. 1.

2. Description of the Configuration of the Direct Current Relay 10 According to the Embodiment of the Present Disclosure Referring to FIGS. 1 to 3, the direct current relay 10 according to the embodiment of the present disclosure includes a frame part 100, a switch part 200, and a core part 300.

In addition, referring to FIGS. 4 to 24, the direct current relay 10 according to the embodiment of the present disclosure includes a movable contact part 400 or 500.

The movable contact part 400 or 500 according to each embodiment may be easily and firmly assembled with a housing 450 or 550, an upper holder 460 or 560, and a lower holder 470 or 570 for stably supporting the movable contact 410 or 510.

Hereinafter, each configuration of the direct current relay 10 according to the embodiment of the present disclosure will be described with reference to the accompanying drawings, and the movable contact part 400 or 500 will be separately described.

(1) Description of the Frame Part 100

The frame part 100 forms the outer side of the direct current relay 10. A predetermined space is formed inside the frame part 100. Various devices performing a function of applying or blocking a current transferred from the outside of the direct current relay 10 may be accommodated in the space.

That is, the frame part 100 functions as a kind of housing. The frame part 100 may be formed of an insulating material such as a synthetic resin. It is to prevent the inside and the outside of the frame part 100 from being arbitrarily electrically currented.

In the illustrated embodiment, the frame part 100 includes an upper frame 110, a lower frame 120, an insulating plate 130, and a support plate 140.

The upper frame 110 forms an upper side of the frame part 100. A predetermined space is formed inside the upper frame 110. The space communicates with a space formed inside the lower frame 120.

The switch part 200 and the movable contact part 400 or 500 may be accommodated in the inner space of the upper frame 110.

The upper frame 110 may be coupled to the lower frame 120. The insulating plate 130 and the support plate 140 may be provided in a space between the upper frame 110 and the lower frame 120.

A fixed contact 220 of the switch part 200 is positioned on one side of the upper frame 110, that is, on the upper side in the illustrated embodiment. A portion of the fixed contact 220 may be exposed on the upper side of the upper frame 110, and may be electrically connected to an external power source or load.

To this end, a through hole through which the fixed contact 220 is through-coupled may be formed on the upper side of the upper frame 110.

The lower frame 120 forms a lower side of the frame part 100. A predetermined space is formed inside the lower frame 120. The core part 300 may be accommodated in the inner space of the lower frame 120. The space communicates with a space formed inside the upper frame 110.

The lower frame 120 may be coupled to the upper frame 110. The insulating plate 130 and the support plate 140 may be provided in a space between the lower frame 120 and the upper frame 110.

The insulating plate 130 and the support plate 140 electrically and physically separate the inner space of the upper frame 110 and the inner space of the lower frame 120.

The insulating plate 130 is positioned between the upper frame 110 and the lower frame 120. The insulating plate 130 electrically separates the upper frame 110 and the lower frame 120. To this end, the insulating plate 130 may be formed of an insulating material such as a synthetic resin.

By the insulating plate 130, any electric current between the switch part 200 and the movable contact part 400 or 500 accommodated in the upper frame 110 and the core part 300 accommodated in the lower frame 120 may be prevented.

A through hole (not shown) is formed at the center of the insulating plate 130. A shaft 440 or 540 of the respective movable contact part 400 or 500 is through-coupled to the through hole (not shown) so as to be movable in the vertical direction.

The support plate 140 is positioned below the insulating plate 130. The insulating plate 130 may be supported by the support plate 140.

The support plate 140 is positioned between the upper frame 110 and the lower frame 120.

The support plate 140 physically separates the upper frame 110 and the lower frame 120. In addition, the support plate 140 supports the insulating plate 130.

The support plate 140 may be formed of a magnetic material. Therefore, the support plate 140 may form a magnetic circuit together with a yoke 330 of the core part 300. A driving force for moving the movable core 370 toward the stationary core 310 may be formed by the magnetic circuit.

A through hole (not shown) is formed at the center of the support plate 140. The shaft 440 or 540 is through-coupled to the through hole (not shown) so as to be movable in the vertical direction.

Accordingly, when the movable core 370 is moved in a direction toward the stationary core 310 or away from the stationary core 310, the respective shaft 440 or 540 and the movable contact 410 or 510 connected to the respective shaft 440 or 540 may also be moved together in the same direction.

(2) Description of the Switch Part 200

The switch part 200 allows or blocks electric current flow according to the operation of the core part 300. Specifically, the switch part 200 may allow or block the electric current by contacting or separating the fixed contact 220 and the movable contact 410 or 510.

The switch part 200 is accommodated in the inner space of the upper frame 110. The switch part 200 may be electrically and physically separated from the core part 300 and the movable core 370 by the insulating plate 130 and the support plate 140.

In the illustrated embodiment, the switch part 200 includes an arc chamber 210, a fixed contact 220, and a sealing member 230.

Although not shown, a magnet member for forming a path of an arc may be provided outside the arc chamber 210. The magnet member may generate an electromagnetic force that forms a path of the generated arc by forming a magnetic field inside the arc chamber 210.

The arc chamber 210 extinguishes an arc generated when the fixed contact 220 and the movable contact 410 or 510 are separated from each other in an inner space. Accordingly, the arc chamber 210 may be referred to as an “arc extinguishing part”.

The arc chamber 210 hermetically accommodates the fixed contact 220 and the movable contact 410 or 510. That is, the fixed contact 220 and the movable contact 410 or 510 are accommodated inside the arc chamber 210. Therefore, an arc generated when the fixed contact 220 and the movable contact 410 or 510 are separated from each other does not arbitrarily leak to the outside.

A gas for extinguishing may be filled in the arc chamber 210. The gas for extinguishing allows the generated arc to be extinguished and discharged to the outside of the direct current relay 10 through a preset path. To this end, a communication hole (not shown) may be formed through a wall surrounding the inner space of the arc chamber 210.

The arc chamber 210 may be formed of an insulating material. In addition, the arc chamber 210 may be formed of a material having high pressure resistance and high heat resistance. This is due to the generated arc being the flow of high temperature and high pressure electrons. In an embodiment, the arc chamber 210 may be formed of a ceramic material.

A plurality of through-holes may be formed on the upper side of the arc chamber 210. A fixed contact 220 is through-coupled to each of the through holes.

In the illustrated embodiment, two fixed contacts 220 are provided, including a first fixed contact 220*a* and a second fixed contact 220*b*. Accordingly, two through holes may also be formed on the upper side of the arc chamber 210.

When the fixed contact 220 is through-coupled to the through hole, the through hole is sealed. That is, the fixed contact 220 is hermetically coupled to the through hole. Accordingly, the generated arc is not discharged to the outside through the through hole.

The lower side of the arc chamber 210 may be open. The insulating plate 130 and the sealing member 230 are in contact with the lower side of the arc chamber 210. That is, the lower side of the arc chamber 210 is sealed by the insulating plate 130 and the sealing member 230.

Accordingly, the arc chamber 210 may be electrically and physically separated from the outer space of the upper frame 110.

The arc extinguished in the arc chamber 210 is discharged to the outside of the direct current relay 10 through a preset path. In an embodiment, the extinguished arc may be discharged to the outside of the arc chamber 210 through the communication hole (not shown).

The fixed contact 220 is in contact with or separated from the movable contact 410 or 510 to apply or block internal and external electric current conduction of the direct current relay 10.

Specifically, when the fixed contact 220 is in contact with the movable contact 410 or 510, the inside and outside of the direct current relay 10 may be conducting electric current. On the other hand, when the fixed contact 220 is separated from the movable contact 410 or 510, the electric current of the inside and outside of the direct current relay 10 may be blocked.

As can be seen from the name, the fixed contact 220 is not moved. That is, the fixed contact 220 is fixedly coupled to the upper frame 110 and the arc chamber 210. Thus, the contact and spacing of the fixed contact 220 and the movable contact 410 or 510 are achieved by the movement of the movable contact 410 or 510.

One end of the fixed contact 220, that is, the upper end in the illustrated embodiment, is exposed to the outside of the upper frame 110. A power source or a load is electrically connected to the one end.

A plurality of fixed contacts 220 may be provided. In the illustrated embodiment, two fixed contacts 220 are provided, including a first fixed contact 220*a* on the left side and a second fixed contact 220*b* on the right side.

The first fixed contact 220*a* is positioned to be biased to one side, that is, the left in the illustrated embodiment, from the center in the longitudinal direction of the movable contact 410 or 510. In addition, the second fixed contact 220*b* is positioned to be biased to the other side, that is, the right in the illustrated embodiment, from the center in the longitudinal direction of the movable contact 410 or 510.

A power source may be electrically connected to any one of the first fixed contact 220*a* and the second fixed contact 220*b*. In addition, a load may be electrically connected to the other one of the first fixed contact 220*a* and the second fixed contact 220*b*.

The other end of the fixed contact 220, that is, the lower end in the illustrated embodiment, extends toward the movable contact 410 or 510.

When the movable contact 410 or 510 is moved in a direction toward the fixed contact 220, that is, upward in the illustrated embodiment, the lower end comes into contact with the movable contact 410 or 510. Accordingly, the outside and the inside of the direct current relay 10 may be conducting electric current.

The lower end of the fixed contact 220 is located within the arc chamber 210.

When the control power is cut off, the movable contact 410 or 510 is spaced apart from the fixed contact 220 by an elastic force of an elastic part 380 of the core part 300.

In this case, as the fixed contact 220 and the movable contact 410 or 510 are spaced apart from each other, an arc is generated between the fixed contact 220 and the movable contact 410 or 510. The generated arc may be extinguished by the gas for extinguishing inside the arc chamber 210 and may be discharged to the outside.

The sealing member 230 blocks any communication between the arc chamber 210 and a space inside the upper frame 110. The sealing member 230 seals the lower side of the arc chamber 210 together with the insulating plate 130 and the support plate 140.

Specifically, the upper side of the sealing member 230 is coupled to the lower side of the arc chamber 210. In addition, the radially inner side of the sealing member 230 is coupled to the outer circumference of the insulating plate 130, and the lower side of the sealing member 230 is coupled to the support plate 140.

Accordingly, the arc generated in the arc chamber 210 and the arc extinguished by the gas for extinguishing do not arbitrarily leak into the inner space of the upper frame 110.

In addition, the sealing member 230 may block any communication between the inner space of the cylinder 360 and the inner space of the frame part 100.

(3) Description of the Core Part 300

The core part 300 moves the movable contact part 400 or 500 upward according to the application of the control power. In addition, when the application of the control power is released, the core part 300 moves the movable contact part 400 or 500 downward again.

The core part 300 may be electrically connected to an external control power (not shown) to receive the control power.

The core part 300 is located below the switch part 200. In addition, the core part 300 is accommodated inside the lower frame 120. The core part 300 and the switch part 200 may be electrically and physically separated from each other by the insulating plate 130 and the support plate 140.

The movable contact part 400 or 500 is positioned between the core part 300 and the switch part 200. The movable contact part 400 or 500 may be moved by a driving force applied by the core part 300. Accordingly, the movable contact 410 or 510 and the fixed contact 220 may be brought into contact with each other so that the direct current relay 10 may be conducting electric current.

In the illustrated embodiment, the core part 300 includes a stationary core 310, a bottom part 320, a yoke 330, a bobbin 340, a coil 350, a cylinder 360, a movable core 370, and an elastic part 380.

The stationary core 310 is magnetized by a magnetic field generated in the coil 350 to generate an electromagnetic attraction force. By the electromagnetic attraction force, the movable core 370 is moved toward the stationary core 310 (upward direction in FIGS. 2 and 3).

The stationary core 310 is not moved. That is, the stationary core 310 is fixedly coupled to the support plate 140 and the cylinder 360.

The stationary core 310 may be provided in any form capable of generating electromagnetic force by being magnetized by a magnetic field. In an embodiment, the stationary core 310 may be formed of a magnetic material or may be provided as a permanent magnet or an electromagnet and the like.

The stationary core 310 is partially accommodated in an upper space inside the cylinder 360. In addition, the outer circumference of the stationary core 310 is in contact with the inner circumference of the cylinder 360.

The stationary core 310 is located between the support plate 140 and the movable core 370.

A through hole (not shown) is formed at the center of the stationary core 310. Each of the shafts 440 and 540 is through-coupled to the through hole (not shown) so as to be vertically movable.

The stationary core 310 is positioned to be spaced apart from the movable core 370 by a predetermined distance. Accordingly, the distance at which the movable core 370 may be moved toward the stationary core 310 may be limited to the predetermined distance. Accordingly, the predetermined distance may be defined as "travel distance of the movable core 370".

One end of the elastic part 380, that is, the upper end in the illustrated embodiment, is in contact with the lower side of the stationary core 310. When the stationary core 310 is magnetized and the movable core 370 is moved upward, the elastic part 380 is compressed and restoring force is stored.

Accordingly, when the application of the control power is released and the magnetization of the stationary core 310 is terminated, the movable core 370 may be returned to downward again by the restoring force.

The bottom part 320 forms a lower boundary of the cylinder 360. In other words, the bottom part 320 may be defined as one surface of the cylinder 360 that surrounds the space formed inside the cylinder 360 from the lower side.

The bottom part 320 forms a limit of a position at which the movable core 370 can be moved downward. That is, as the movable core 370 moves downward, the lower end of the movable core 370 is in contact with the bottom part 320. Accordingly, the movable core 370 is no longer moved downward.

In the illustrated embodiment, the bottom part 320 is spaced apart from the movable core 370.

Specifically, one side of the movable core 370, which faces the bottom part 320 in a state in which the movable core 370 is not drawn into the stationary core 310, that is, the lower end in the illustrated embodiment is spaced apart from the bottom part 320.

Alternatively, the lower end of the movable core 370 may contact the bottom part 320.

The bottom part 320 is preferably formed of an insulating material such as a synthetic resin. This is to prevent the electromagnetic force or the like applied to the movable core 370 from being disturbed.

The yoke 330 forms a magnetic circuit as a control power is applied. The magnetic circuit formed by the yoke 330 may control the direction of the magnetic field formed by the coil 350.

Accordingly, when the control power is applied, the coil 350 may generate a magnetic field in a direction in which the movable core 370 is moved toward the stationary core 310. The yoke 330 may be formed of a conductive material capable of conducting electric current.

The yoke 330 is accommodated inside the lower frame 120. The yoke 330 surrounds the coil 350. The coil 350 may be accommodated inside the yoke 330 to be spaced apart from the inner circumferential surface of the yoke 330 by a predetermined distance.

The bobbin 340 is accommodated inside the yoke 330. That is, the yoke 330, the coil 350, and the bobbin 340 on which the coil 350 is wound are sequentially arranged in a radially inward direction from the outer circumference of the lower frame 120.

The upper side of the yoke 330 contacts the support plate 140. In addition, the outer circumference of the yoke 330 may be positioned to contact the inner circumference of the lower frame 120 or to be spaced apart from the inner circumference of the lower frame 120 by a predetermined distance.

The coil 350 is wound on the bobbin 340. The bobbin 340 is accommodated inside the yoke 330.

The bobbin 340 may include a flat plate-shaped upper portion and a flat plate-shaped lower portion, and a cylindrical pillar part extending in a longitudinal direction and connecting the upper portion and the lower portion. That is, the bobbin 340 has a bobbin shape.

An upper portion of the bobbin 340 is in contact with a lower side of the support plate 140. The coil 350 is wound on the pillar part of the bobbin 340. The thickness of the coil 350 to be wound may be equal to or smaller than the diameters of the upper and lower portions of the bobbin 340.

A hollow part extending in the longitudinal direction is formed through the pillar part of the bobbin 340. The cylinder 360 may be accommodated in the hollow part. The pillar part of the bobbin 340 may be arranged to have the same central axis as the stationary core 310, the movable core 370, and the respective shaft 440 or 540.

The coil 350 generates a magnetic field by an applied control power. The stationary core 310 may be magnetized by a magnetic field generated by the coil 350, and an electromagnetic attraction force may be applied to the movable core 370.

The coil 350 is wound around the bobbin 340. Specifically, the coil 350 is wound around the pillar part of the bobbin 340 and stacked radially outward of the pillar part. The coil 350 is accommodated inside the yoke 330.

When the control power is applied, the coil 350 generates a magnetic field. In this case, the intensity or direction of the magnetic field generated by the coil 350 may be controlled by the yoke 330. The stationary core 310 is magnetized by the magnetic field generated by the coil 350.

When the stationary core 310 is magnetized, the movable core 370 is subjected to an electromagnetic force, that is, an attraction force, in a direction toward the stationary core 310. Accordingly, the movable core 370 is moved in a direction toward the stationary core 310, that is, upward in the illustrated embodiment.

The cylinder 360 accommodates the stationary core 310, the movable core 370, the elastic part 380, and the respective shaft 440 or 540. The movable core 370 and the respective shaft 440 or 540 may be moved upward and downward direction inside the cylinder 360.

The cylinder 360 is located in the hollow part formed in the pillar part of the bobbin 340. The upper end of the cylinder 360 is in contact with the lower surface of the support plate 140.

The side surface of the cylinder 360 is in contact with the inner circumferential surface of the pillar part of the bobbin 340. An upper opening of the cylinder 360 may be sealed by the stationary core 310.

The lower surface, that is, the bottom part 320 of the cylinder 360 may contact the inner surface of the lower frame 120. As described above, the distance at which the movable core 370 is moved downward may be limited by the bottom part 320.

When the control power is applied, the movable core 370 is moved toward the stationary core 310 by electromagnetic attraction force generated by the stationary core 310.

As the movable core 370 is moved, the shaft 440 or 540 coupled to the movable core 370 is moved in the direction toward the stationary core 310, that is, upward in the illustrated embodiment. In addition, as the shaft 440 or 540 is moved, the movable contact part 400 coupled to the shaft 440 or 540 is moved upward.

Accordingly, the fixed contact 220 and the movable contact 410 or 510 may be brought into contact with each other so that the direct current relay 10 may be conducting electric current with an external power source or a load.

The movable core 370 may be provided in any form capable of being subjected to attraction by electromagnetic force. In an embodiment, the movable core 370 may be formed of a magnetic material or may be provided as a permanent magnet or an electromagnet and the like.

The movable core 370 is accommodated inside the cylinder 360. In addition, the movable core 370 may be moved in a height direction of the cylinder 360 inside the cylinder 360, that is, in a vertical direction in the illustrated embodiment.

Specifically, the movable core 370 may be moved in a direction toward the stationary core 310 and in a direction away from the stationary core 310.

The movable core 370 is coupled to the shaft 440 or 540. The movable core 370 may be moved integrally with the shaft 440 or 540. When the movable core 370 is moved upward or downward, the shaft 440 or 540 is also moved upward or downward. Accordingly, the movable contact 410 or 510 is also moved upward or downward.

The movable core 370 is located below the stationary core 310. The movable core 370 is spaced apart from the stationary core 310 by a predetermined distance. The predetermined distance is the distance at which the movable core 370 may be moved in the vertical direction as described above.

In the illustrated embodiment, the movable core 370 has a circular cross-section and has a cylindrical shape extending in one direction, that is, in the vertical direction in the illustrated embodiment. The movable core 370 may be accommodated in the cylinder 360 so as to be liftable, and may have an arbitrary shape capable of moving in a direction toward the stationary core 310 or in a direction opposite to the stationary core 310.

The elastic part 380 elastically supports the movable core 370 and the stationary core 310. The elastic part 380 is located between the movable core 370 and the stationary core 310.

The elastic part 380 is in contact with the movable core 370. Specifically, one end of the elastic part 380 facing the movable core 370, that is, the lower end in the illustrated embodiment, is in contact with the top surface of the movable core 370.

The other end of the elastic part 380 facing the stationary core 310, that is, the upper end in the illustrated embodiment, is accommodated inside the stationary core 310. That is, in the illustrated embodiment, the elastic part 380 is partially accommodated in the hollow part formed radially outside the central axis of the stationary core 310. The upper end of the elastic part 380 is in contact with one surface of the stationary core 310 surrounding the hollow part of the stationary core 310 from the upper side.

The elastic part 380 may be provided in any form capable of deforming, storing elastic force (i.e., restoring force) and transmitting the stored elastic force to other members. In the illustrated embodiment, the elastic part 380 extends in the vertical direction and is provided in the form of a coil spring through which a hollow part is formed.

The elastic part 380 is coupled to the shaft 440. Specifically, the shaft 440 is through-coupled to the hollow part formed inside the elastic part 380.

When the movable core 370 is raised toward the stationary core 310, the elastic part 380 is compressed between the movable core 370 and the stationary core 310 and stores the elastic force. When the current applied to the coil 350 is blocked and the movable core 370 is switched to a state in which it is not magnetized, the elastic part 380 is stretched to lower the movable core 370.

3. Description of the Movable Contact Part (400) According to an Embodiment of the Present Disclosure Referring back to FIGS. 2 and 3, the direct current relay 10 according to an embodiment of the present disclosure includes a movable contact part 400.

The movable contact part 400 according to the present embodiment may be easily and firmly coupled to a housing 450 surrounding the movable contact 410, an upper holder 460, and a lower holder 470.

In addition, the movable contact part 400 according to the present embodiment may be formed such that the coupling direction of a member for fixing the movable contact 410 (that is, the support part 420) and the coupling direction of the upper holder 460 and the lower holder 470 are the same.

Accordingly, the manufacturing process of the movable contact part 400 is simplified and facilitated, and accordingly, a situation such as misassembly may be prevented.

Hereinafter, the movable contact part 400 according to an embodiment of the present disclosure will be described in detail with reference to FIGS. 4 to 22.

The movable contact part 400 includes the movable contact 410 and a configuration for moving the movable contact 410. The direct current relay 10 may be conducting electric current with an external power source or a load by the movable contact part 400.

The movable contact part 400 is accommodated in the inner space of the upper frame 110. In addition, the movable contact part 400 is accommodated in the arc chamber 210 to be movable vertically.

A fixed contact 220 is positioned above the movable contact part 400. The movable contact part 400 is accommodated in the arc chamber 210 to be movable in a direction toward the fixed contact 220 and in a direction away from the fixed contact 220.

A core part 300 is positioned below the movable contact part 400. The movement of the movable contact part 400 may be achieved by the movement of the movable core 370.

In the illustrated embodiment, the movable contact part 400 includes a movable contact 410, a support part 420, a yoke part 430, a shaft 440, a housing 450, an upper holder 460, and a lower holder 470.

The movable contact 410 is in contact with the fixed contact 220 according to the application of the control power. Accordingly, the direct current relay 10 is conducting electric current with an external power source and load. In addition, the movable contact 410 is spaced apart from the fixed contact 220 when the application of the control power is released. Accordingly, the direct current relay 10 is blocked from conducting electric current with an external power source and load.

The movable contact 410 may be formed of a conductive material. The movable contact 410 in contact with the fixed contact 220 may be electrically connected to an external power source or a load.

The movable contact 410 is positioned adjacent to the fixed contact 220.

The upper side of the movable contact 410 is covered by the yoke part 430 and the upper holder 460. Specifically, the upper yoke 431 and the upper holder 460 are positioned on the upper side of the movable contact 410 in a direction toward the movable contact 410 (the direction from the upper side toward the lower side in the illustrated embodiment).

In an embodiment, the upper side of the movable contact 410 may be in contact with the upper holder 460. In addition, in the above embodiment, the upper yoke 431 and the upper holder 460 are positioned to surround each corner in the width direction of the movable contact 410, that is, the front side and the rear side in the illustrated embodiment.

The lower side of the movable contact 410 is covered by the yoke part 430, the housing 450, and the lower holder 470. Specifically, the lower yoke 432, the housing 450, and the lower holder 470 are positioned on the lower side of the movable contact 410 in a direction opposite to the movable contact 410 (the direction from the upper side toward the lower side in the illustrated embodiment).

In an embodiment, the lower side of the movable contact 410 may be in contact with the lower yoke 432.

The movable contact 410 is supported by the support part 420. Specifically, the lower side of the movable contact 410 is elastically supported by a spring 421. In addition, an insertion pin 422 and a support pin 423 of the support part 420 are through-coupled to the movable contact 410.

In this case, the spring 421 may elastically support the movable contact 410 while being compressed by a predetermined length so that the movable contact 410 is not arbitrarily moved in a direction opposite to the fixed contact 220 (i.e., downward).

The movable contact 410 extends in the longitudinal direction, that is, left and right direction in the illustrated embodiment. That is, the length of the movable contact 410 is longer than the width. Accordingly, opposite ends in the longitudinal direction of the movable contact 410 accommodated in the housing 450 are exposed to the outside of the housing 450.

The length of the movable contact 410, that is, the length in the left and right direction in the illustrated embodiment, may be longer than the distance at which the plurality of fixed contacts 220 are spaced apart from each other. Accordingly, even if the movable contact 410 is moved slightly in a longitudinal direction thereof, reliability of contact between the movable contact 410 and the fixed contact 220 may be maintained.

The width of the movable contact 410 may be the same as the distance at which a plurality of connection parts 462 provided in the upper holder 460 are spaced apart from each other. That is, each surface in the width direction of the movable contact 410 may be supported by being in contact with a plurality of connection parts 462, respectively.

Accordingly, the movable contact 410 may not be arbitrarily moved in the width direction, that is, in the front and rear direction in the illustrated embodiment.

In the illustrated embodiment, the movable contact 410 includes an insertion groove 411 and an insertion hole 412.

The insertion groove 411 is a space into which the support part 420 is partially inserted. Specifically, the insertion pin 422 and the support pin 423 of the support part 420 are partially inserted into the insertion groove 411.

The insertion groove 411 is formed recessed on one surface of the movable contact 410. In the illustrated embodiment, the insertion groove 411 is formed recessed in a direction toward the upper holder 460, that is, on the upper surface.

In the illustrated embodiment, the insertion groove 411 is formed as a cylindrical space having a circular cross-section and a height in the vertical direction. In this case, the diameter of the cross-section of the insertion groove 411 is preferably formed to be equal to or larger than the outer diameter of the support pin 423.

The shape of the insertion groove 411 may be changed according to the shape of the insertion pin 422 and the support pin 423.

The insertion hole 412 is formed inside the insertion groove 411, that is, radially inside the outer circumference surrounding the insertion groove 411.

The insertion hole 412 is a space through which the insertion pin 422 is formed. The insertion hole 412 is formed through the one surface of the movable contact 410, that is, the upper surface, in the vertical direction (i.e., the thickness direction of the movable contactor 410).

In the illustrated embodiment, the insertion hole 412 is formed as a cylindrical hollow part having a circular cross-section and a height in the vertical direction. In this case, it is preferable that the diameter of the cross-section of the insertion hole 412 be smaller than the diameter of the cross-section of the insertion groove 411, but larger than or equal to the diameter of the cross-section of the insertion pin 422.

The shape of the insertion hole 412 may be changed according to the shape of the insertion pin 422.

The support part 420 supports the movable contact 410. By the support part 420, the movable contact 410 may be maintained in a state of being coupled with other components of the movable contact part 400.

The support part 420 may support the movable contact 410 in a plurality of directions. In the illustrated embodiment, the support part 420 supports the movable contact 410 by penetrating above and below the movable contact 410 and the movable contact 410.

In the illustrated embodiment, the support part 420 includes a spring 421, an insertion pin 422, and a support pin 423.

The spring 421 elastically supports the movable contact 410. When the core part 300 is operated and the movable contact 410 is in contact with the fixed contact 220, an electrical repulsive force may be generated between the movable contact 410 and the fixed contact 220.

At this time, the spring 421 elastically supports the movable contact 410 from the lower side. Accordingly, despite the electrical repulsive force, arbitrary spacing between the movable contact 410 and the fixed contact 220 may be prevented.

The spring 421 may be provided in any form capable of storing a restoring force by a shape change and transmitting the stored restoring force to other components. In the illustrated embodiment, the spring 421 is provided as a coil spring. Further, in the illustrated embodiment, the spring 421 extends between the movable contact 410 and the housing 450, i.e., in a vertical direction.

The spring 421 is located below the movable contact 410. The upper end of the spring 421 is in contact with the lower surface of the movable contact 410. The lower end of the spring 421 is in contact with the upper surface of the housing 450.

The spring 421 is accommodated in a space surrounded by the movable contact 410, the housing 450, and the upper holder 460. Specifically, the upper side of the spring 421 is surrounded by the movable contact 410 and the upper holder 460. In addition, the outer circumference of the spring 421, that is, the front side and the rear side in the illustrated embodiment, is surrounded by the upper holder 460. Furthermore, the lower side of the spring 421 is surrounded by the housing 450.

A hollow part is formed inside the spring 421. The hollow part is formed through the spring 421 in the direction in which it extends, that is, in the vertical direction in the illustrated embodiment. The insertion pin 422 of the support part 420 is inserted through the hollow part. In addition, a support protrusion 454 of the housing 450 is inserted into a lower side of the hollow part, that is, one side facing the housing 450.

Accordingly, the spring 421 is not arbitrarily removed from the space surrounded by the movable contact 410, the housing 450, and the upper holder 460 due to the insertion pin 422 and the support protrusion 454.

The insertion pin 422 is coupled through the movable contact 410 to prevent the movable contact 410 from swinging. The insertion pin 422 is partially inserted into the insertion groove 411 of the movable contact 410 and is coupled through the insertion hole 412.

The insertion pin 422 is coupled to the spring 421. Specifically, the insertion pin 422 is formed inside the spring 421, and is through-coupled to the hollow part extending in the vertical direction in the illustrated embodiment.

The insertion pin 422 is coupled to the support pin 423. Specifically, the insertion pin 422 is through-coupled to the hollow part formed in the support pin 423.

The insertion pin 422 is coupled to the yoke part 430. Specifically, the insertion pin 422 is through-coupled to a through hole (reference numeral not indicated) formed in the upper yoke 431 and a through hole (reference numeral not indicated) formed in the lower yoke 432, respectively.

The insertion pin 422 is coupled to the upper holder 460. Specifically, the insertion pin 422 is through-coupled to a through opening 467 formed through the upper holder 460.

The insertion pin 422 is coupled to the lower holder 470. Specifically, the insertion pin 422 is through-coupled to an opening 473 formed in the lower holder 470.

In the illustrated embodiment, the insertion pin 422 has a circular cross-section and is formed to extend in the vertical direction, and has a cylindrical shape with a hollow part extending in the direction of extension formed therein.

In this case, it is preferable that the diameter of the cross-section of the insertion pin 422 is equal to or less than the diameter of the insertion groove 411 and the insertion hole 412. Furthermore, it is preferable that the diameter of the cross-section of the insertion pin 422 is less than or equal to the diameter of the cross-section of the hollow part formed inside the spring 421.

One end of the insertion pin 422 in the longitudinal direction, that is, the upper end in the illustrated embodiment, may be exposed to the outside of the movable contact part 400. That is, the upper end of the insertion pin 422 may be located outside the upper yoke 431.

The other end in the longitudinal direction of the insertion pin 422, that is, the lower end in the illustrated embodiment, may be in contact with the support protrusion 454 of the housing 450. Accordingly, it may be said that the insertion pin 422 is supported by the support protrusion 454.

The support pin 423 is coupled to the movable contact 410 to prevent the movable contact 410 from swinging. The support pin 423 is partially inserted into the insertion groove 411 of the movable contact 410.

The support pin 423 is coupled to the insertion pin 422. Specifically, the insertion pin 422 is through-coupled to a hollow part formed through the support pin 423 in the vertical direction.

The support pin 423 is coupled to the yoke part 430. Specifically, the support pin 423 is through-coupled to a through-hole (reference numeral not indicated) formed in the upper yoke 431, respectively.

The support pin 423 is coupled to the upper holder 460. Specifically, the support pin 423 is through-coupled to a through opening 467 formed through the upper holder 460.

The support pin 423 may include a plurality of portions. In the illustrated embodiment, the support pin 423 includes a first portion that is formed in an annular shape with a larger diameter and forming one side (i.e., lower side) facing the movable contact 410, and a second portion that is continuous with the first portion, extends in a direction opposite to the movable contact 410 (i.e., upward), and is formed in an annular shape.

In this case, the outer diameter of the first portion of the support pin 423 is preferably equal to or less than the diameter of the insertion groove 411, but is preferably equal to or greater than the diameter of the insertion hole 412.

Further, the outer diameter of the second portion of the support pin 423 is preferably equal to or less than the diameter of the through hole (reference numeral not indicated) formed in the upper yoke 431 and the through opening 467 formed in the upper holder 460.

The yoke part 430 offsets an electrical repulsive force generated when the fixed contact 220 and the movable contact part 400 come into contact when control power is applied. When the control power is applied, the yoke part 430 is magnetized to generate an attractive force.

The yoke part 430 is disposed to surround the movable contact 410. Specifically, in the illustrated embodiment, the yoke part 430 surrounds the upper side, the front side, the rear side, and the lower side of the movable contact 410.

A plurality of yoke parts 430 may be provided. The plurality of yoke parts 430 may be disposed to surround the movable contact 410 at different positions. In the illustrated embodiment, the yoke part 430 includes an upper yoke 431 positioned relatively above and a lower yoke 432 positioned relatively below.

The upper yoke 431 is positioned to cover the movable contact 410 on one side of the movable contact 410. In the illustrated embodiment, the upper yoke 431 is positioned above the upper holder 460, and is positioned to face the movable contact 410 and the lower holder 470 with the upper holder 460 interposed therebetween.

That is, the upper yoke 431 is located on the outer side and also the uppermost side of the movable contact part 400.

The upper yoke 431 partially surrounds the movable contact 410. In the illustrated embodiment, the upper yoke 431 surrounds the upper side, the front side, and the rear side of the movable contact 410.

To this end, the upper yoke 431 may include a first portion covering the movable contact 410 from an upper side, and a plurality of second portions each continuous with the first portion and extending downward to cover the movable contact 410 from a front side and a rear side, respectively.

In this case, the extension length of the first portion (the extension length in the front and rear direction in the illustrated embodiment) may be longer than the extension length of the base 461 of the upper holder 460 (the extension length in the front and rear direction in the illustrated embodiment).

In addition, the extension length of the second portion (the extension length in the vertical direction in the illustrated embodiment) may be shorter than the extension length of the connection part 462 of the upper holder 460 (the extension length in the vertical direction in the illustrated embodiment).

Accordingly, the upper yoke 431 covers the upper side of the upper holder 460, and partially covers each side of the upper holder 460 in the front and rear direction.

A through hole (reference numeral not indicated) may be formed in the first portion of the upper yoke 431. An insertion pin 422 and a support pin 423 of the support part 420 are through-coupled to the through hole.

A plurality of protrusion portions and depression portions are formed in the first portion of the upper yoke 431.

Specifically, the plurality of protrusion portions are formed to protrude from an upper surface of the first portion. In addition, the plurality of depression portions are formed to protrude from a lower surface of the first portion at positions corresponding to the plurality of protrusion portions.

In other words, the plurality of protrusion portions are formed on one side of the first portion opposite to the upper holder 460, and the plurality of depression portions are formed on the other side of the first portion facing toward the upper holder 460.

A plurality of fitting protrusions 466 formed on the upper holder 460 may be inserted into the plurality of depression portions, respectively. Accordingly, the coupling direction and position of the upper yoke 431 and the upper holder 460 may be limited.

The upper yoke 431 is disposed to face the lower yoke 432. Specifically, the upper yoke 431 is disposed to face the lower yoke 432 with the upper holder 460 and the movable contact 410 interposed therebetween.

As will be described below, the upper holder 460 is coupled to the lower holder 470. Accordingly, the lower yoke 432 is moved in a direction in which the movable contact 410 is pressed toward the upper holder 460 by the attractive force applied by the upper yoke 431.

That is, the upper yoke 431 may be magnetized to form an electromagnetic attractive force. By the attractive force formed by the upper yoke 431, the lower yoke 432 is subjected to a force in a direction toward the upper yoke 431, that is, upward in the illustrated embodiment.

Accordingly, the movable contact 410 located between the upper yoke 431 and the lower yoke 432 is subjected to a force in a direction toward the upper yoke 431, that is, in a direction upward in the illustrated embodiment. It will be understood that the direction is the same as the direction in which the movable contact 410 faces the fixed contact 220.

Accordingly, the electrical repulsive force generated between the movable contact 410 and the fixed contact 220 may be offset by the attractive force generated in the upper yoke 431 and the lower yoke 432. Accordingly, the contact state between the movable contact 410 and the fixed contact 220 may be stably maintained.

The upper yoke 431 may be provided in any form capable of forming an attractive force with the lower yoke 432 by being magnetized by an electric current application or a magnetic field.

The lower yoke 432 is positioned to cover the movable contact 410 on the other side of the movable contact. In the illustrated embodiment, the lower yoke 432 is positioned below the movable contact 410, and is positioned to face the upper yoke 431 and the upper holder 460 with the movable contact 410 interposed therebetween.

The lower yoke 432 is positioned inside the movable contact part 400 and adjacent to the movable contact 410.

The lower yoke 432 partially surrounds the movable contact 410. In the illustrated embodiment, the lower yoke 432 surrounds the lower side of the movable contact 410. In an embodiment, the lower yoke 432 may be in contact with the movable contact 410.

The lower yoke 432 extends in one direction. In this case, the extension direction of the lower yoke 432 may be the same as the extension direction of the movable contact 410. In the illustrated embodiment, the lower yoke 432 extends in a same left-right direction as the extension direction of the movable contact 410.

The lower yoke 432 may be provided in a plate shape. In the illustrated embodiment, the lower yoke 432 is provided in a rectangular plate shape in which the corners of the front and rear directions and the left and right directions protrude outward.

A plurality of protrusion portions are formed on one side of the lower yoke 432 facing the movable contact 410, that is, the upper surface in the illustrated embodiment. The plurality of protrusion portions are positioned to be spaced apart from each other in a direction in which the lower yoke 432 extends, that is, left and right direction in the illustrated embodiment.

Figure 10:
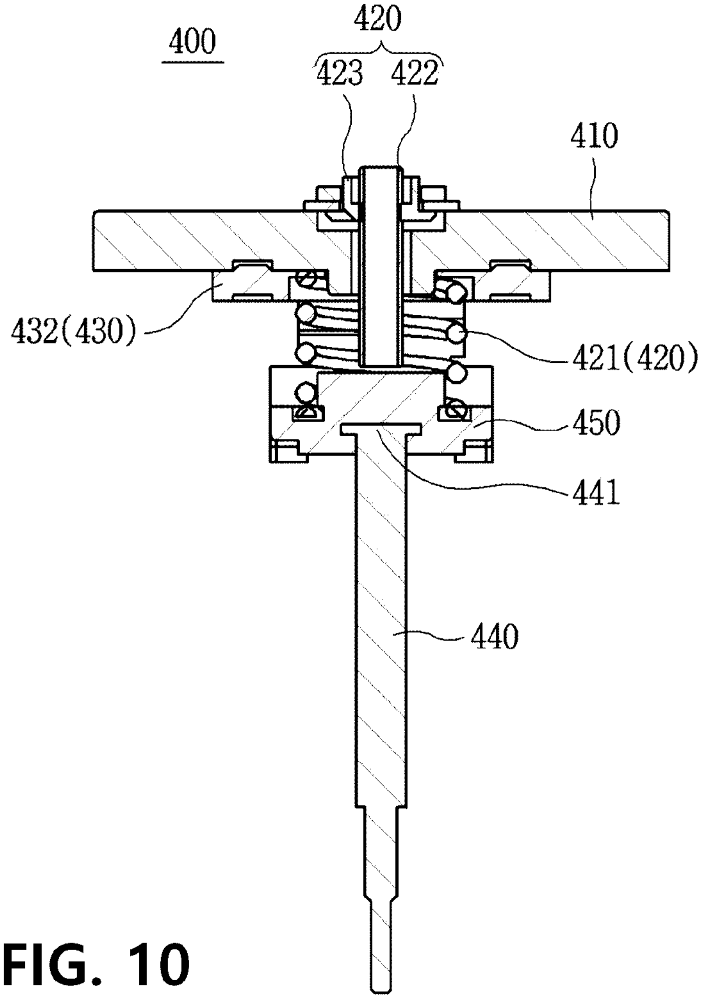
FIG. 10 is a front cross-sectional view illustrating the movable contact part of FIG. 4.
Figure 11:
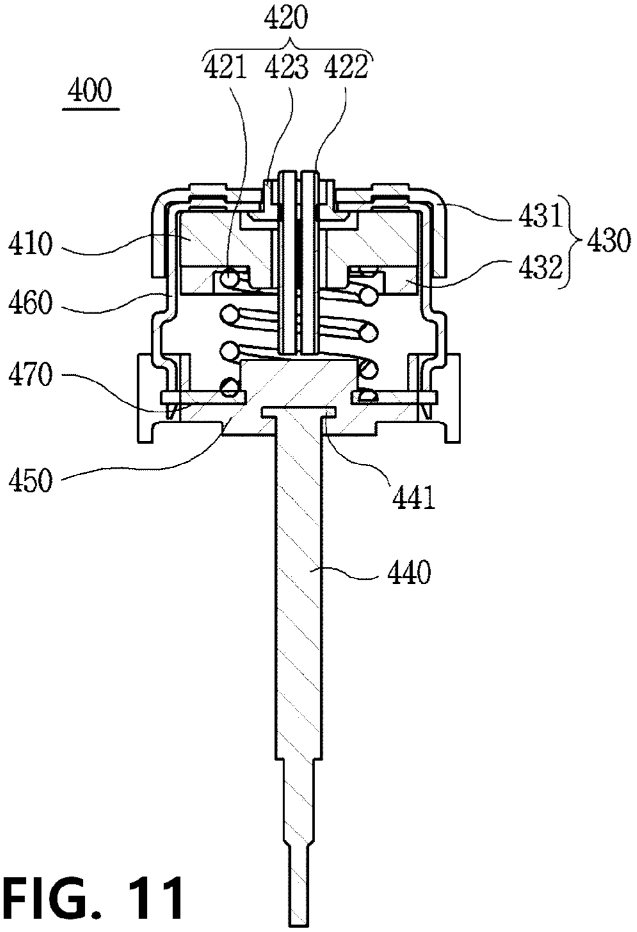
FIG. 11 is a side cross-sectional view illustrating the movable contact part of FIG. 4.
Figure 12:
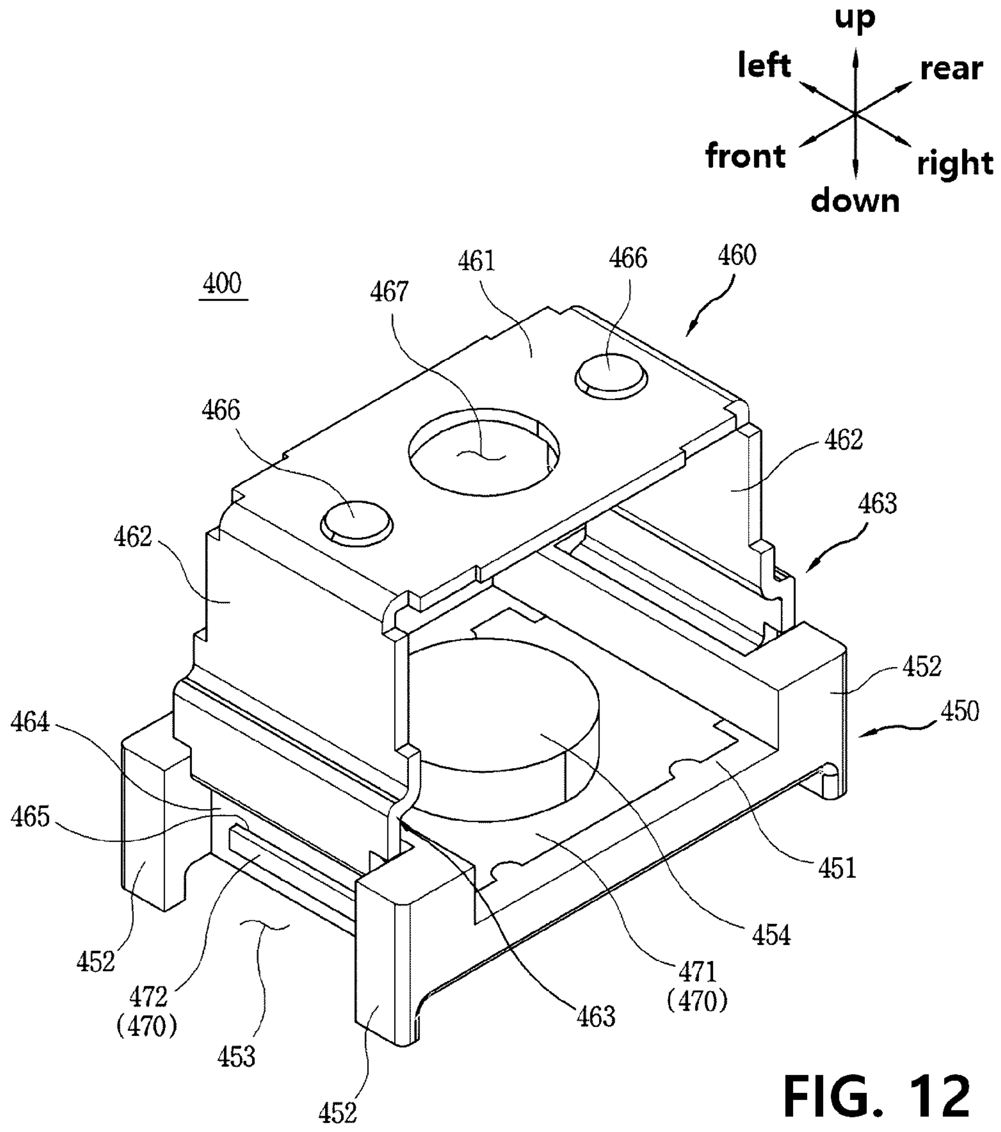
FIG. 12 is a perspective view illustrating a coupling relationship between an upper holder, a movable contact holder, and a lower holder provided in the movable contact part of FIG. 4.
Figure 13:
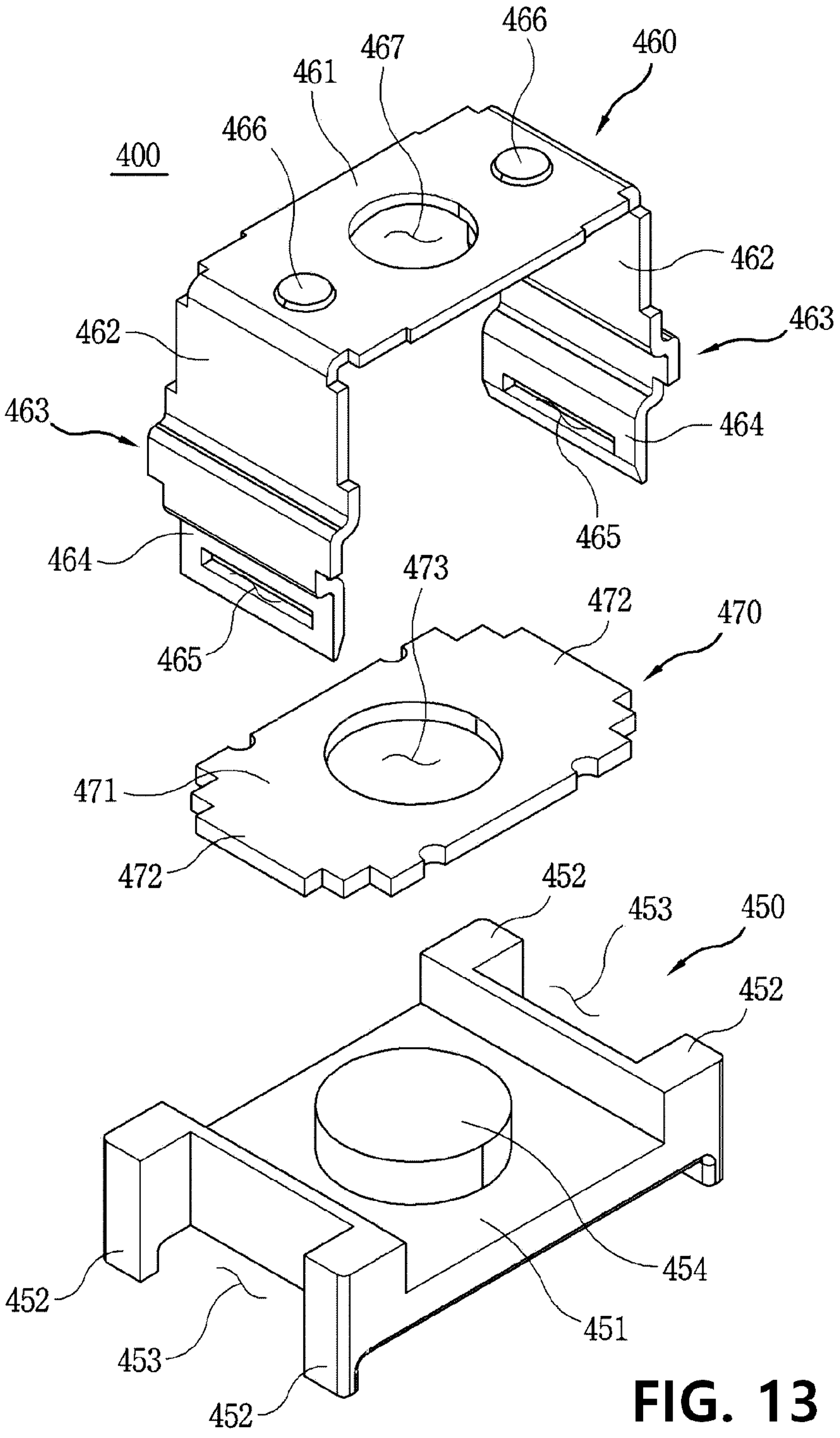
FIG. 13 is an exploded perspective view illustrating a coupling relationship between an upper holder, a movable contact holder, and a lower holder provided in the movable contact part of FIG. 4.
Figure 14:
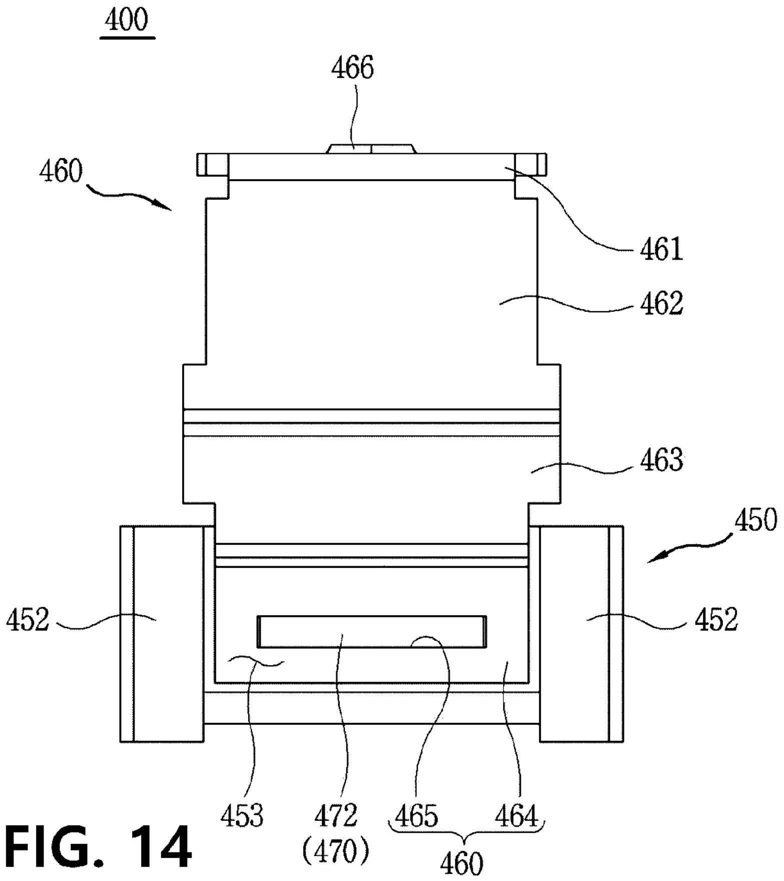
FIG. 14 is a front view illustrating a coupling relationship between an upper holder, a movable contact holder, and a lower holder provided in the movable contact part of FIG. 4.
Figure 15:
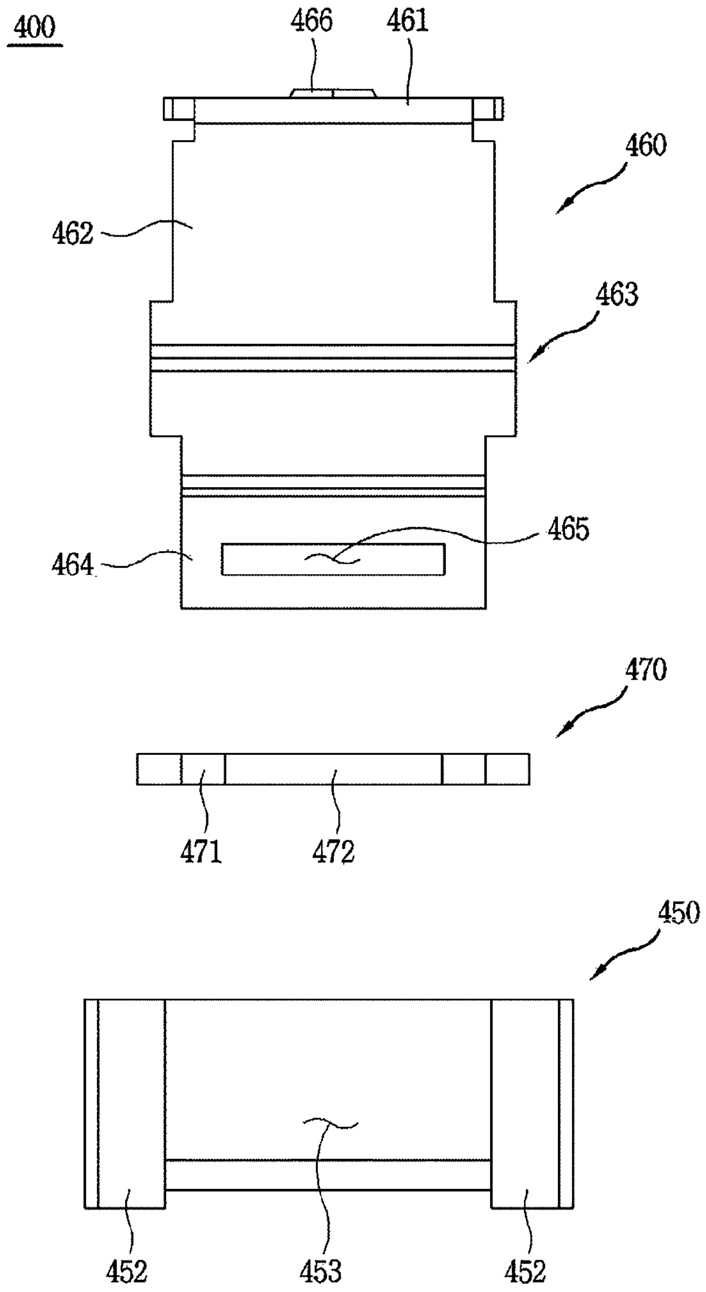
FIG. 15 is an exploded front view illustrating a coupling relationship between an upper holder, a movable contact holder, and a lower holder provided in the movable contact part of FIG. 4.
Figure 16:
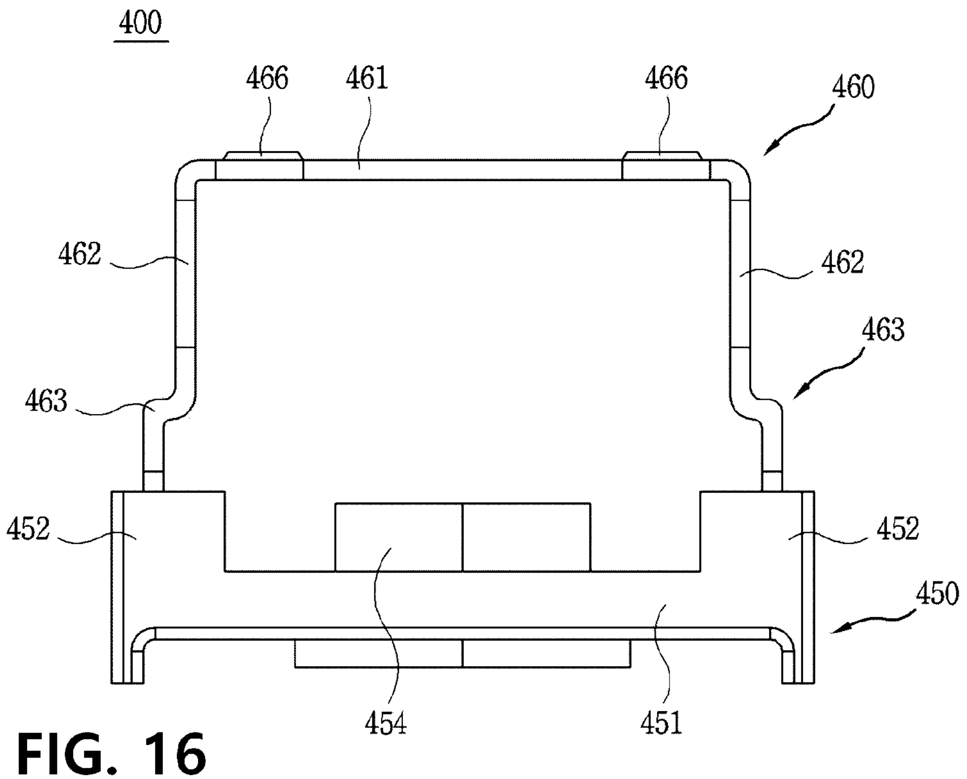
FIG. 16 is a side view illustrating a coupling relationship between an upper holder, a movable contact holder, and a lower holder provided in the movable contact part of FIG. 4.
Figure 17:
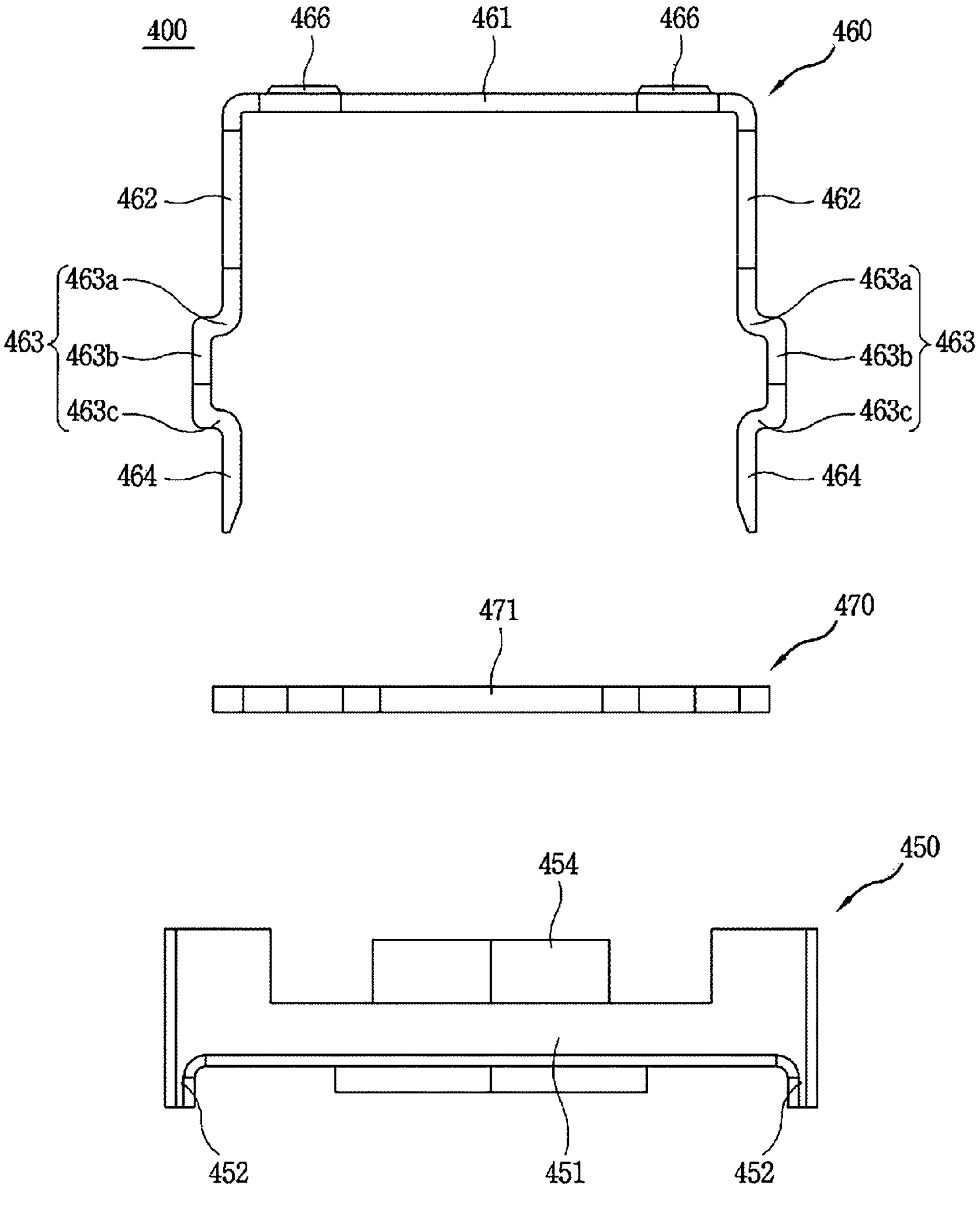
FIG. 17 is an exploded side view illustrating a coupling relationship between an upper holder, a movable contact holder, and a lower holder provided in the movable contact part of FIG. 4.
Figure 18:
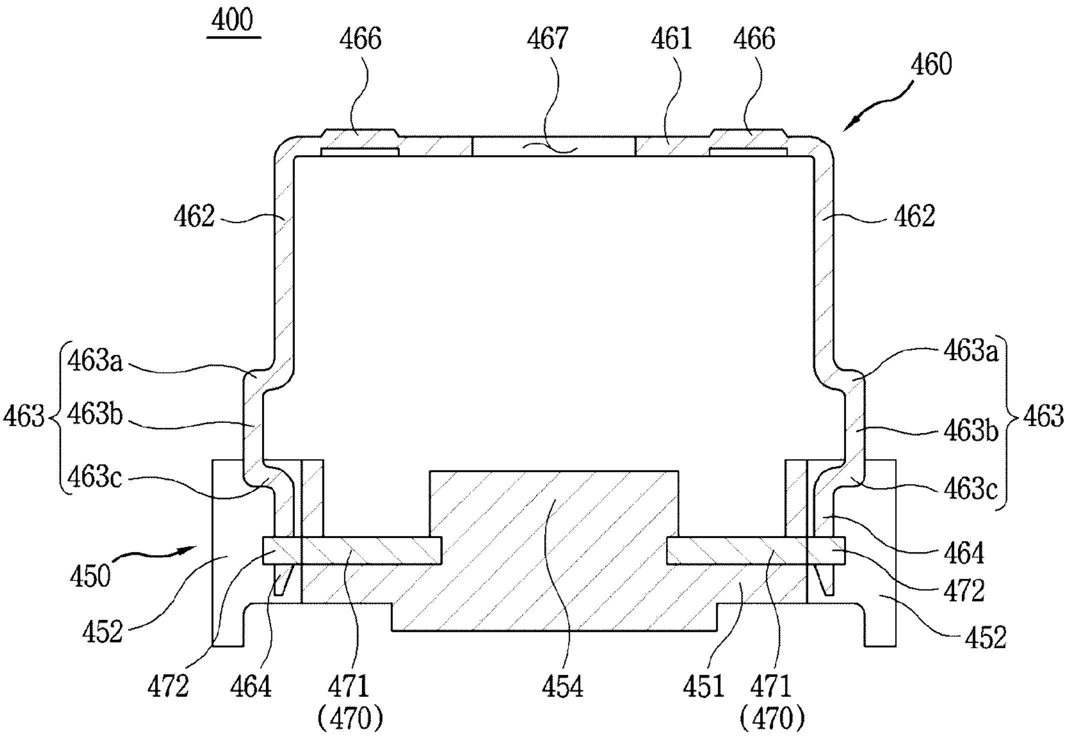
FIG. 18 is a side cross-sectional view illustrating a coupling relationship between an upper holder, a movable contact holder, and a lower holder provided in the movable contact part of FIG. 4.

The plurality of protrusion portions are inserted into and coupled to a plurality of grooves formed on the lower side of the movable contact 410 (see FIG. 10). Accordingly, the coupling direction and the position of the lower yoke 432 and the movable contact 410 may be restricted.

The lower yoke 432 is disposed to face the upper yoke 431. Specifically, the lower yoke 432 is disposed to face the upper yoke 431 with the movable contact 410 and the upper holder 460 interposed therebetween.

A through hole is formed inside the lower yoke 432. A spring 421 and an insertion pin 422 of the support part 420 are coupled through the through hole (see FIG. 10).

The lower yoke 432 may be provided in any form capable of forming an attractive force with the upper yoke 431 by being magnetized by an electric current application or a magnetic field.

The shaft 440 is coupled to the movable core 370 and the housing 450, respectively. The shaft 440 transfers the lifting and lowering of the movable core 370 to the housing 450. Accordingly, when the movable core 370 is raised toward the stationary core 310, the shaft 440 and other components of the movable contact part 400 are also raised together.

As a result, the movable contact 410 and the fixed contact 220 may be in contact with each other, so that the direct current relay 10 may be electrically connected to an external power source or a load.

The shaft 440 extends between the movable contact part 400 and the movable core 370. In the illustrated embodiment, one side of the shaft 440 toward the movable contact part 400, that is, the upper end in the illustrated embodiment, is coupled to the housing 450.

In addition, the other side of the shaft 440 toward the movable core 370, that is, the lower end in the illustrated embodiment, is coupled through the movable core 370. In the illustrated embodiment, the shaft 440 has a circular cross-section and has a cylindrical shape extending in the vertical direction.

The shaft 440 may be divided into a plurality of portions according to the size of the member to be coupled member and the diameter. In the illustrated embodiment, the shaft 440 may be coupled to the housing 450, may be coupled to a head part 441 having a relatively larger diameter and the movable core 370, and may be divided into remaining portions having a relatively smaller diameter.

The shaft 440 and the movable core 370 may be fixedly coupled to each other. In an embodiment, the shaft 440 and the movable core 370 may be welded and coupled.

In addition, the shaft 440 and the housing 450 may be fixedly coupled to each other. In the illustrated embodiment, the head part 441 of the shaft 440 is inserted into a space inside a body part 451 of the housing 450.

The housing 450 forms the body of the movable contact part 400. The housing 450 supports the movable contactor 410 on one side, that is, the lower side in the illustrated embodiment. The housing 450 is coupled with the upper holder 460 and the lower holder 470 or the like to form a space in which the movable contact 410 is accommodated.

The housing 450 is located between the shaft 440 and the spring 421.

The housing 450 is coupled to the shaft 440. Specifically, a space may be formed inside the body part 451 of the housing 450, and the head part 441 may be inserted and coupled thereto. The housing 450 may be moved along with the shaft 440.

The housing 450 supports the spring 421. Accordingly, the movable contact 410 may be elastically supported by the housing 450.

A space is formed inside the housing 450. The lower holder 470 is partially accommodated in the space. Specifically, the lower holder 470 is accommodated in the space of the housing 450 such that the coupling protrusion 472 is exposed to the outside.

In an embodiment, the housing 450 and the lower holder 470 may be manufactured by insert injection.

The housing 450 extends in one direction. In the illustrated embodiment, the housing 450 is formed such that the extension length in the front-rear direction is longer than the extension length in the left-right direction. The shape of the housing 450 may be changed according to the shape of the movable contact 410.

The housings 450 may be formed to be symmetrical with each other along its extension direction. That is, in the illustrated embodiment, the housing 450 may be formed to be symmetrical to each other in the front-rear direction. In addition, the housing 450 may be formed to be symmetrical to each other in the left-right direction.

In the illustrated embodiment, the housing 450 includes a body part 451, an arm part 452, a coupling space part 453, and a support protrusion 454.

The body part 451 forms an outer shape of the housing 450. The body part 451 extends in one direction and in the other direction. In the illustrated embodiment, the body part 451 extends in the front and rear directions and the left and right directions.

In this case, the extension length of the body part 451 in the front-rear direction may be determined according to the length of the movable contact 410 in the front-rear direction as described above.

The body part 451 is formed to have a predetermined thickness. A plurality of predetermined spaces are formed in the body part 451. The head part 441 of the shaft 440 is inserted into any one of the plurality of predetermined spaces. The lower holder 470 is partially inserted into another one of the plurality of predetermined spaces.

In an embodiment, the plurality of predetermined spaces may communicate with each other. In the above embodiment, it may be said that a single predetermined space is formed in the body part 451.

In a direction in which the body part 451 extends long, the arm part 452 and the coupling space part 453 are positioned at each corner of the front side and the rear side in the illustrated embodiment. Further, the support protrusion 454 is positioned inside one side surface of the body part 451 facing the movable contact 410, that is, inside the upper side surface in the illustrated embodiment.

The arm part 452 supports the upper holder 460 inserted into the coupling space part 453 at different positions. In addition, the arm part 452 forms the coupling space part 453 together with the body part 451.

The arm part 452 is formed to extend from each corner in a direction in which the body part 451 extends. In the illustrated embodiment, the arm part 452 extends from the front side corner and the rear side corner of the body part 451, respectively.

The length at which the arm part 452 extends may be changed according to the structure of the arc chamber 210 in which the movable contact part 400 is accommodated.

The arm part 452 forms the coupling space part 453 together with the body part 451. The arm part 452 partially surrounds the coupling space part 453 together with the body part 451.

A plurality of arm parts 452 may be formed. The plurality of arm parts 452 may be coupled to the body part 451 at different positions. In the illustrated embodiment, two pairs of arm parts 452 are formed, and each extends at the front side corner and the rear side corner of the body part 451, respectively.

In addition, each pair of arm parts 452 may be spaced apart from each other along different directions in which the body part 451 extends. In the illustrated embodiment, each pair of arm parts 452 are spaced apart from each other in the left and right directions, and are respectively continuous with the left and right corners of the body part 451.

Accordingly, the coupling space part 453 surrounded by the body part 451 and the arm part 452 may be formed on the front side and the rear side of the body part 451, respectively. Accordingly, the upper holder 460 may be coupled to the front side and the rear side of the body part 451, respectively.

In addition, the distance at which each pair of arm parts 452 are spaced apart from each other may be the same as the length of a coupling part 464 of the upper holder 460 in the width direction (i.e., in the left-right direction in the illustrated embodiment).

Accordingly, the upper holder 460 may be accommodated in the coupling space part 453 formed on the front side and the rear side of the body part 451, respectively, and each corner in the width direction (the left and right direction in the illustrated embodiment) thereof may be supported by the arm part 452.

Accordingly, the upper holder 460 and the housing 450 may be stably coupled.

The coupling space part 453 is a space in which the coupling part 464 of the upper holder 460 is accommodated. The coupling space part 453 may be defined as a space surrounded by the body part 451 and the arm part 452.

That is, in the illustrated embodiment, the coupling space part 453 is formed such that a direction of one of the front side and the rear side is surrounded by the body part 451, and the left side and the right side are respectively surrounded by a pair of arm parts 452.

In this case, the width of the coupling space part 453, that is, the length in the left and right direction in the illustrated embodiment, may be the same as the length in the width direction of the coupling part 464 of the upper holder 460, that is, the length in the left and right direction. As described above, the length of the width of the coupling space part 453 is the same as the distance at which the pair of arm parts 452 are spaced apart.

A plurality of coupling space parts 453 may be formed. As described above, the housing 450 may be formed to be symmetrical to each other in the front-rear direction. Accordingly, the coupling space part 453 may be formed on the front side and the rear side of the body part 451, respectively.

Other portions of the coupling space part 453 other than a portion surrounded by the body part 451 and the arm part 452 may communicate with the outside.

In the illustrated embodiment, the upper side, front side and lower side of the coupling space part 453 located on the front side of the body part 451 communicate with the outside. In addition, the upper side, rear side and lower side of the coupling space part 453 located on the rear side of the body part 451 communicate with the outside.

Accordingly, the coupling part 464 of the upper holder 460 may be inserted into the coupling space part 453 at any one or more of the upper side, the front side, the rear side, and the lower side of the coupling space part 453.

The coupling protrusion 472 is partially exposed in a direction surrounded around the body part 451 of each side of the coupling space part 453.

That is, as described above, the lower holder 470 is integrally formed with the body part 451. In addition, the lower holder 470 includes a coupling protrusion 472 protruding in an extended direction (the front and rear direction in the illustrated embodiment).

In this case, the coupling protrusion 472 may be partially exposed in the coupling space part 453, and inserted into and coupled to a coupling groove 465 of the upper holder 460. This will be described later in detail.

The support protrusion 454 is inserted into the hollow part of the spring 421. The spring 421 may not be moved by the support protrusion 454 while being supported by the body part 451.

In addition, the support protrusion 454 supports the other end of the insertion pin 422 in the extension direction, that is, the lower end in the illustrated embodiment. The distance at which the insertion pin 422 is moved downward may be limited by the support protrusion 454.

The support protrusion 454 is formed inside the body part 451. Specifically, the support protrusion 454 protrudes in a direction toward the movable contact 410, that is, to the upper side in the illustrated embodiment, from one side surface of the body part 451 facing the movable contact 410, that is, the upper side surface in the illustrated embodiment.

The position of the support protrusion 454 may be determined corresponding to the position of the spring 421. In an embodiment, the support protrusion 454 may be positioned so that the cross-section thereof has a center equal to a center of the cross-section of the spring 421 and the insertion pin 422.

In the above embodiment, the support protrusion 454 may be positioned such that a center of the cross-section thereof has the same central axis as the insertion groove 411 and the insertion hole 412 of the movable contact 410, the through hole formed in the upper yoke 431 and the lower yoke 432, respectively, and the opening 473 of the lower holder 470, respectively.

The support protrusion 454 may be any shape capable of supporting the spring 421 and the insertion pin 422. In the illustrated embodiment, the support protrusion 454 has a circular cross-section and has a cylindrical shape that protrudes in a direction toward the movable contact 410 (i.e., upward direction).

The support protrusion 454 is penetrated through the opening 473 of the lower holder 470. In this case, the diameter of the cross-section of the support protrusion 454 may be smaller than the diameter of the opening 473.

The upper holder 460 partially surrounds the movable contact 410. In addition, the upper holder 460 is coupled with the housing 450 and the lower holder 470 to form a space in which the movable contact 410 can be accommodated.

The upper holder 460 is located on one side of the movable contact 410 opposite the housing 450, that is, the upper side in the illustrated embodiment. The upper holder 460 is positioned to face the housing 450 with the movable contact 410 therebetween.

The upper holder 460 is positioned between the upper yoke 431 and the movable contact 410. That is, the upper holder 460 is located below the upper yoke 431 and above the movable contact 410.

The upper holder 460 is coupled to the upper yoke 431. Specifically, in the illustrated embodiment, the upper yoke 431 is coupled to the upper holder 460 while covering the upper side, a portion of the front side, and a portion of the rear side of the upper holder 460.

In this case, the fitting protrusion 466 formed on the upper holder 460 is inserted into the plurality of depression portions formed in the upper yoke 431. Accordingly, the coupling direction and the position of the upper holder 460 and the upper yoke 431 may be restricted.

The upper holder 460 is coupled to the movable contact 410. Specifically, in the illustrated embodiment, the upper holder 460 is coupled to the movable contact 410 while partially surrounding each of the upper side, the front side, and the rear side of the movable contact 410.

The upper holder 460 is coupled to the housing 450. Specifically, in the illustrated embodiment, the coupling part 464 located on the lower side of the upper holder 460 is inserted into the coupling space part 453 formed on the front side and the rear side of the housing 450, respectively.

The upper holder 460 is coupled to the lower holder 470. Specifically, the coupling protrusion 472 of the lower holder 470 is inserted into the coupling groove 465 of the upper holder 460 so that the upper holder 460 and the lower holder 470 are coupled.

The upper holder 460 may be formed of a material having a predetermined elasticity. As will be described later, this is to insert the coupling protrusion 472 into the coupling groove 465.

Specifically, the coupling part 464 may be pressed in a direction opposite to the housing 450 to be deformed in shape so that the coupling groove 465 and the coupling protrusion 472 are matched, and then restored to the original shape, and the coupling protrusion 472 may be inserted into the coupling groove 465.

In addition, the upper holder 460 may be formed of an insulating material. It is to prevent any electric current conduction with the movable contact 410 or the fixed contact 220.

In an embodiment, the upper holder 460 may be formed of a metal material such as SUS304. Alternatively, the upper holder 460 may be formed of an injection molding of a synthetic resin material.

The upper holder 460 may be formed in a plate shape having a width (i.e., a length in the left and right direction) of a predetermined length. Specifically, a base 461, a connection part 462, a cushioning part 463, and a coupling part 464 described below may be formed in a plate shape having a width of the predetermined length.

In the illustrated embodiment, the upper holder 460 includes a base 461, a connection part 462, a cushioning part 463, a coupling part 464, a coupling groove 465, a fitting protrusion 466, and a through opening 467.

The base 461 forms one side of the upper holder 460 toward the upper yoke 431, that is, the upper side in the illustrated embodiment. The base 461 is positioned between the upper yoke 431 and the movable contact 410.

The base 461 is covered by the upper yoke 431. In an embodiment, the base 461 may be in contact with the upper yoke 431.

The base 461 covers the movable contact 410. In an embodiment, the base 461 may be in contact with the movable contact 410.

The base 461 may extend in the same direction as the direction in which the upper yoke 431 extends. In the illustrated embodiment, the base 461 is formed in a plate shape in which the extension length in the front-rear direction is longer than the extension length in the left-right direction, and has a thickness in the vertical direction.

The fitting protrusion 466 is positioned on one side of the base 461 facing the upper yoke 431, that is, on the upper surface in the illustrated embodiment.

Each corner in the direction in which the base 461 extends longer, that is, in the front-rear direction in the illustrated embodiment, is continuous with the connection part 462.

The connection part 462 forms the other side of the upper holder 460 facing the lower holder 470, that is, a portion of the front side and a portion of the rear side in the illustrated embodiment.

The connection part 462 is continuous with the base 461. In addition, a plurality of connection parts 462 may be provided. In the illustrated embodiment, two connection parts 462 are provided, and are continuous with the front side and rear side corners of the base 461, respectively.

The connection part 462 may extend at a predetermined angle with the base 461. In the illustrated embodiment, the connection part 462 extends in a direction perpendicular to the base 461 toward the lower holder 470, that is, downward.

The connection part 462 partially surrounds the movable contact 410. Specifically, in the illustrated embodiment, the connection part 462 may surround a portion of the front side and a portion of the rear side of the movable contact 410.

One end of the connection part 462 facing the base 461, that is, the upper end in the illustrated embodiment, is continuous with the base 461. The other end of the connection part 462 opposite the base 461, that is, the lower end in the illustrated embodiment, is continuous with the cushioning part 463.

The cushioning part 463 partially surrounds a space in which the movable contact 410 is accommodated. The cushioning part 463 includes a plurality of portions extending at a predetermined angle with each other.

The cushioning part 463 may cushion an external force applied to the upper holder 460. That is, even when an external force in a vertical direction or a horizontal direction is applied to the upper holder 460, shape deformation or displacement of the upper holder 460 may be minimized by the plurality of portions of the cushioning part 463.

The cushioning part 463 is continuous with the connection part 462. Specifically, one end of the cushioning part 463 facing the connection part 462, that is, the upper end in the illustrated embodiment, is continuous with the lower end of the connection part 462.

A plurality of cushioning parts 463 may be provided. In the illustrated embodiment, two cushioning parts 463 are provided and are continuous with the front side connection part 462 and the rear side connection part 462, respectively.

The cushioning part 463 extends in a direction opposite to the connection part 462 at a predetermined angle with the connection part 462. In the illustrated embodiment, the cushioning part 463 extends perpendicular to the connection part 462 outside the space in which the movable contact 410 is accommodated.

That is, the cushioning part 463 located on the front side extends to the front side, and the cushioning part 463 located on the rear side extends to the rear side.

The cushioning part 463 is continuous with the coupling part 464. In the illustrated embodiment, the cushioning part 463 has a lower end contiguous with an upper end of the coupling part 464.

As described above, the cushioning part 463 includes a plurality of portions that are continuous with each other at a predetermined angle. In the illustrated embodiment, the cushioning part 463 includes a first bent part **463*a*, a second bent part 463*b*, and a third bent part 463*c***.

The first bent part **463*a* forms one side of the cushioning part 463 facing the connection part 462, that is, the upper side in the illustrated embodiment. The first bent part 463*a* is continuous with a lower end of the connection part 462**.

The first bent part **463*a* extends at a predetermined angle with the connection part 462. In the illustrated embodiment, the first bent part 463*a* extends perpendicular to the connection part 462 and opposite to a space in which the movable contact 410** is accommodated.

That is, in the illustrated embodiment, the first bent part **463*a* located on the front side extends toward the front side. In addition, the first bent part 463*a*** located on the rear side extends toward the rear side.

The first bent part **463*a* is continuous with the second bent part 463*b***.

The second bent part **463*b* forms the other side of the cushioning part 463, that is, a middle portion in the illustrated embodiment. The second bent part 463*b* is continuous with an outer end of the first bent part 463*a***.

Specifically, the second bent part **463*b* located on the front side is continuous with the front side end of the first bent part 463*a*. The second bent part 463*b* located on the rear side is continuous with the rear side end of the first bent part 463*a***.

The second bent part **463*b* extends at a predetermined angle with the first bent part 463*a*. In the illustrated embodiment, the second bent part 463*b* extends perpendicular to the first bent part 463*a* in a direction toward the lower holder 470**, that is, downward.

The second bent part **463*b* is continuous with the third bent part 463*c***.

The third bent part **463*c* forms the other side of the cushioning part 463, that is, the lower side in the illustrated embodiment. The third bent part 463*c* is continuous with a lower end of the second bent part 463*b***.

The third bent part **463*c* extends at a predetermined angle with the second bent part 463*b*. In the illustrated embodiment, the third bent part 463*c* extends perpendicular to the second bent part 463*b* and toward the space in which the movable contact 410** is accommodated.

Specifically, the third bent part **463*c* located on the front side extends toward the rear side. The third bent part 463*c*** located on the rear side extends toward the front side.

In an embodiment, an inner end of the first bent part 463*a* and an inner end of the third bent part 463*c* may be positioned to overlap in a vertical direction.

Specifically, the rear side ends of the first bent part 463*a* and the third bent part 463*c* of the cushioning part 463 located on the front side may be disposed at the same position in the vertical direction. Specifically, the front side ends of the first bent part 463*a* and the third bent part 463*c* of the cushioning part 463 located on the rear side may be disposed at the same position in the vertical direction.

Accordingly, the shape of the cross-section of the cushioning part 463 is formed in a concave-convex shape protruding outward, that is, in a direction opposite to the space in which the movable contact 410 is accommodated. Specifically, in the illustrated embodiment, the cushioning part 463 located on the front side has a concave-convex shape protruding toward the front side. In addition, the cushioning part 463 located on the rear side has a concave-convex shape protruding toward the rear side.

The third bent part 463*c* is continuous with the coupling part 464.

The coupling part 464 is a portion where the upper holder 460 is coupled to the housing 450 and the lower holder 470.

A plurality of coupling parts 464 may be provided. In the illustrated embodiment, two coupling parts 464 are provided, and are located on the front side and the rear side, respectively.

The coupling part 464 is accommodated in the coupling space part 453 of the housing 450. As described above, the coupling space part 453 is formed on the front side and the rear side of the housing 450, respectively. Accordingly, the plurality of coupling parts 464 are inserted into each of the coupling space parts 453 positioned on the front side and the rear side of the housing 450, respectively.

The coupling part 464 is supported by the arm part 452. Specifically, each corner of the coupling part 464 in its width direction (i.e., the left-right direction in the illustrated embodiment) is supported by the arm part 452.

As described above, a pair of arm parts 452 are positioned on the front side and the rear side of the housing 450, respectively. In addition, each pair of arm parts 452 are positioned spaced apart from each other in the width direction of the coupling part 464, that is, in the left-right direction.

Accordingly, when the coupling part 464 is inserted into the coupling space part 453, each corner of the coupling part 464 in the left-right direction may be supported by each pair of arm parts 452 spaced apart from each other. In an embodiment, each corner in the left-right direction of the coupling part 464 may be in contact with an inner surface of each pair of arm parts 452 (i.e., each surface of each pair of arm parts 452 facing each other).

As also described above, the length of the coupling space part 453 in the width direction (i.e., left-right direction) may be determined according to the distance at which each pair of arm parts 452 are spaced apart from each other.

Thus, the coupling part 464 is formed to have a width (i.e., a length in the left-right direction) equal to or less than the distance at which each pair of arm parts 452 are spaced apart from each other. In an embodiment, the width of the coupling part 464 may be the same as the length of the coupling space part 453 in the width direction.

In the above embodiment, each corner of the coupling part 464 inserted into the coupling space part 453 in the width direction may be closely supported by the arm part 452 so that the upper holder 460 and the housing 450 may be firmly coupled.

The coupling part 464 is continuous with the cushioning part 463. Specifically, one side of the coupling part 464 opposite to the lower holder 470, that is, an upper end in the illustrated embodiment, is continuous with an inner end of the third bent part 463*c*.

The coupling part 464 may extend at a predetermined angle with the cushioning part 463. In an embodiment, the coupling part 464 may extend perpendicular to the third bent part 463*c* and toward the housing 450 and the lower holder 470.

The coupling part 464 may have a thickness (i.e., length in the front-rear direction) that changes along its extension direction. That is, in the illustrated embodiment, the thickness of the coupling part 464 may be reduced as it goes downward.

In particular, the lower end of the coupling part 464 may extend inclined toward the body part 451 of the housing 450 along the upper side. Accordingly, when the upper holder 460 is coupled to the housing 450 from the top to the bottom, the lower end of the coupling part 464 may be easily inserted into the coupling space part 453.

A coupling groove 465 is formed through the inside of the coupling part 464.

The coupling groove 465 is a portion where the upper holder 460 is coupled to the lower holder 470. Specifically, the coupling protrusion 472 of the lower holder 470 is coupled through the coupling groove 465.

The coupling groove 465 is formed through the coupling part 464. Specifically, the coupling groove 465 is formed through the direction toward the space in which the movable contact 410 is accommodated and in a direction opposite thereto, that is, in a front and rear direction in the illustrated embodiment.

In the illustrated embodiment, the coupling groove 465 is formed to have a rectangular cross-section in which a length in the left and right direction is longer than a length in the vertical direction. As will be described later, the shape of the coupling groove 465 may be changed according to the shape of the coupling protrusion 472.

In the illustrated embodiment, the coupling groove 465 is located adjacent to the center of the coupling part 464. In an embodiment, the center of the cross-section of the coupling groove 465 may be the same as the center of the coupling part 464. The position of the coupling groove 465 may be changed according to the position of the coupling protrusion 472.

In this case, the coupling protrusion 472 protrudes relatively further outward than the coupling part 464. That is, the coupling protrusion 472 located on the front side is located more on the front side than the coupling part 464 on the front side. Likewise, the coupling protrusion 472 located on the rear side is located more on the rear side than the coupling part 464 on the rear side.

Therefore, in order for the coupling protrusion 472 to be inserted into the coupling groove 465, the coupling part 464 must be deformed toward the outside by a predetermined distance. In addition, after the coupling protrusion 472 is inserted into the coupling groove 465, the coupling part 464 must be restored to the original shape.

Accordingly, the coupling part 464 is formed of a material having a predetermined elasticity so as to deform and recover the shape as described above.

The fitting protrusion 466 is inserted into a fitting groove recessed in the upper yoke 431. Accordingly, the coupling direction and position of the upper yoke 431 and the upper holder 460 may be limited.

The fitting protrusion 466 is located on one side of the upper holder 460 facing the upper yoke 431. Specifically, in the illustrated embodiment, the fitting protrusion 466 is formed to protrude from the upper surface of the base 461 in a direction toward the upper yoke 431(i.e., upward).

The fitting protrusion 466 may be provided in any shape that may be inserted into the fitting groove of the upper yoke 431. In the illustrated embodiment, the fitting protrusion 466 has a circular cross-section and has a cylindrical shape extending in the vertical direction. The shape of the fitting protrusion 466 may be changed according to the shape of the fitting groove.

A plurality of fitting protrusions 466 may be provided. The plurality of fitting protrusions 466 may be positioned to be spaced apart from each other. In the illustrated embodiment, two fitting protrusions 466 are provided, and are spaced apart from each other in a front-rear direction with a through opening 467 therebetween.

The number and position of the fitting protrusions 466 may be changed according to the number and position of the fitting grooves of the upper yoke 431.

The through opening 467 is a portion through which the support part 420 is coupled. The through opening 467 is formed through the inside of the upper holder 460.

Specifically, the through opening 467 is formed through the inside of the base 461 in the thickness direction (i.e., the vertical direction) of the base 461.

The through opening 467 may communicate with a through hole (reference numeral not indicated) formed through the upper yoke 431, an insertion hole 412 of the movable contact 410, a through hole (reference numeral not indicated) formed through the lower yoke 432, and a hollow part of the spring 421.

Accordingly, the insertion pin 422 of the support part 420 may be coupled to the movable contact 410, the spring 421, the yoke part 430, and the upper holder 460. In addition, the support pin 423 of the support part 420 may be coupled to the movable contact 410, the upper yoke 431, and the upper holder 460.

In an embodiment, the through opening 467 may be formed and arranged to have the same central axis as a through hole (reference numeral not indicated) formed through the upper yoke 431, an insertion hole 412 of the movable contact 410, a through hole (reference numeral not indicated) formed through the lower yoke 432, and a hollow part of the spring 421.

In the illustrated embodiment, the through opening 467 has a circular cross-section and is formed through in the vertical direction. A surface surrounding the through opening 467, that is, an inner circumference of the base 461 may be formed to be smaller than the outer diameter of the second portion of the support pin 423.

Accordingly, the support pin 423 is covered by the upper holder 460, so may not be arbitrarily separated from the movable contact 410.

The position and shape of the through opening 467 may be changed according to the shape of the insertion pin 422 or the support pin 423 of the support part 420.

The lower holder 470 partially surrounds the movable contact 410. In addition, the lower holder 470 is coupled to the upper holder 460 to form a space in which the movable contact 410 is accommodated.

The lower holder 470 is coupled to the housing 450. Specifically, the lower holder 470 is accommodated in a predetermined space formed in the housing 450. The lower holder 470 may be integrally formed with the housing 450. In an embodiment, the lower holder 470 and the housing 450 may be formed by insert injection molding.

Thus, the lower holder 470, like the housing 450, is located below the movable contact 410 and the upper holder 460. In addition, the lower holder 470 surrounds the lower side of the space in which the movable contact 410 is accommodated together with the housing 450.

The lower holder 470 is partially exposed to the outside of the housing 450. In the illustrated embodiment, the coupling protrusion 472 located on the front side and the rear side of the lower holder 470 is exposed to the outside. Accordingly, the lower holder 470 may be coupled to the upper holder 460 through the coupling protrusion 472.

The lower holder 470 may extend in one direction, that is, in the front and rear direction in the illustrated embodiment, and may be formed in a plate shape having a width of a predetermined length (i.e., a length in the left and right direction).

In the illustrated embodiment, the lower holder 470 includes a flat plate part 471, a coupling protrusion 472, and an opening 473.

The flat plate part 471 forms a body of the lower holder 470. The flat plate part 471 may be formed in a plate shape and may be accommodated in the space formed in the housing 450.

In the illustrated embodiment, the flat plate part 471 is formed to have a length in the front-rear direction longer than a length in the left-right direction, and is provided in a rectangular plate shape having a thickness in the vertical direction.

In this case, it is preferable that the length of the flat plate part 471 in each direction is smaller than that of the housing 450. This is to prevent the flat plate part 471 from being arbitrarily exposed to the outside by being accommodated in the space formed inside the housing 450.

The shape of the flat plate part 471 may be changed according to the shape of the housing 450.

An opening 473 is located inside the flat plate part 471. The support protrusion 454 of the housing 450 may be coupled through the opening 473.

A coupling protrusion 472 is positioned at each end in the direction in which the flat plate part 471 extends long, that is, at each end in the front-rear direction in the illustrated embodiment.

The coupling protrusion 472 is inserted into and coupled to the coupling groove 465 of the upper holder 460. Accordingly, the lower holder 470 and the upper holder 460 may be coupled to each other.

The coupling protrusion 472 is continuous with the flat plate part 471. In addition, a plurality of coupling protrusions 472 may be provided to be coupled to the flat plate part 471 at different positions. In the illustrated embodiment, two coupling protrusions 472 are provided, and coupled to each end in a direction in which the flat plate part 471 is elongated, that is, in a front-rear direction of the flat plate part 471, respectively.

In an embodiment, the coupling protrusion 472 and the flat plate part 471 may be integrally formed.

In the illustrated embodiment, the coupling protrusion 472 has a rectangular cross-section and is formed in a rectangular plate shape having a thickness in a vertical direction. As will be described later, the shape of the coupling protrusion 472 may be variously changed according to the shape of the coupling groove 465.

The coupling protrusion 472 is exposed to the outside of the body part 451 of the housing 450. Specifically, the coupling protrusion 472 is partially exposed to the coupling space part 453 formed in the longitudinal direction (i.e., the front-rear direction) of the body part 451, respectively.

The coupling groove 465 of the upper holder 460 may be coupled to the exposed coupling protrusion 472.

The opening 473 is a space through which the support protrusion 454 of the housing 450 is coupled. The opening 473 is formed through the flat plate part 471 in the thickness direction, that is, in the vertical direction in the illustrated embodiment.

The opening 473 is located inside the flat plate part 471. In an embodiment, the opening 473 may be arranged to have the same central axis as the center of the flat plate part 471.

In the illustrated embodiment, the opening 473 is formed to have a circular cross-section having a predetermined diameter. The position and shape of the opening 473 may be changed according to the position and shape of the support protrusion 454.

As the support protrusion 454 is coupled through the opening 473, the coupling state of the housing 450 and the lower holder 470 may be stably maintained.

Meanwhile, as described above, the coupling groove 465 of the upper holder 460 and the coupling protrusion 472 of the lower holder 470 may be formed in various shapes, numbers, and arrangements.

That is, in the embodiments shown in FIGS. 4 to 18, the coupling protrusion 472 is provided in a rectangular plate shape having an extension length in the left-right direction longer than an extension length in the front-rear direction and a thickness in the vertical direction. In addition, in the above embodiment, a single number of coupling protrusions 472 are positioned in each coupling space part 453 in the front-rear direction, respectively.

Figure 19:
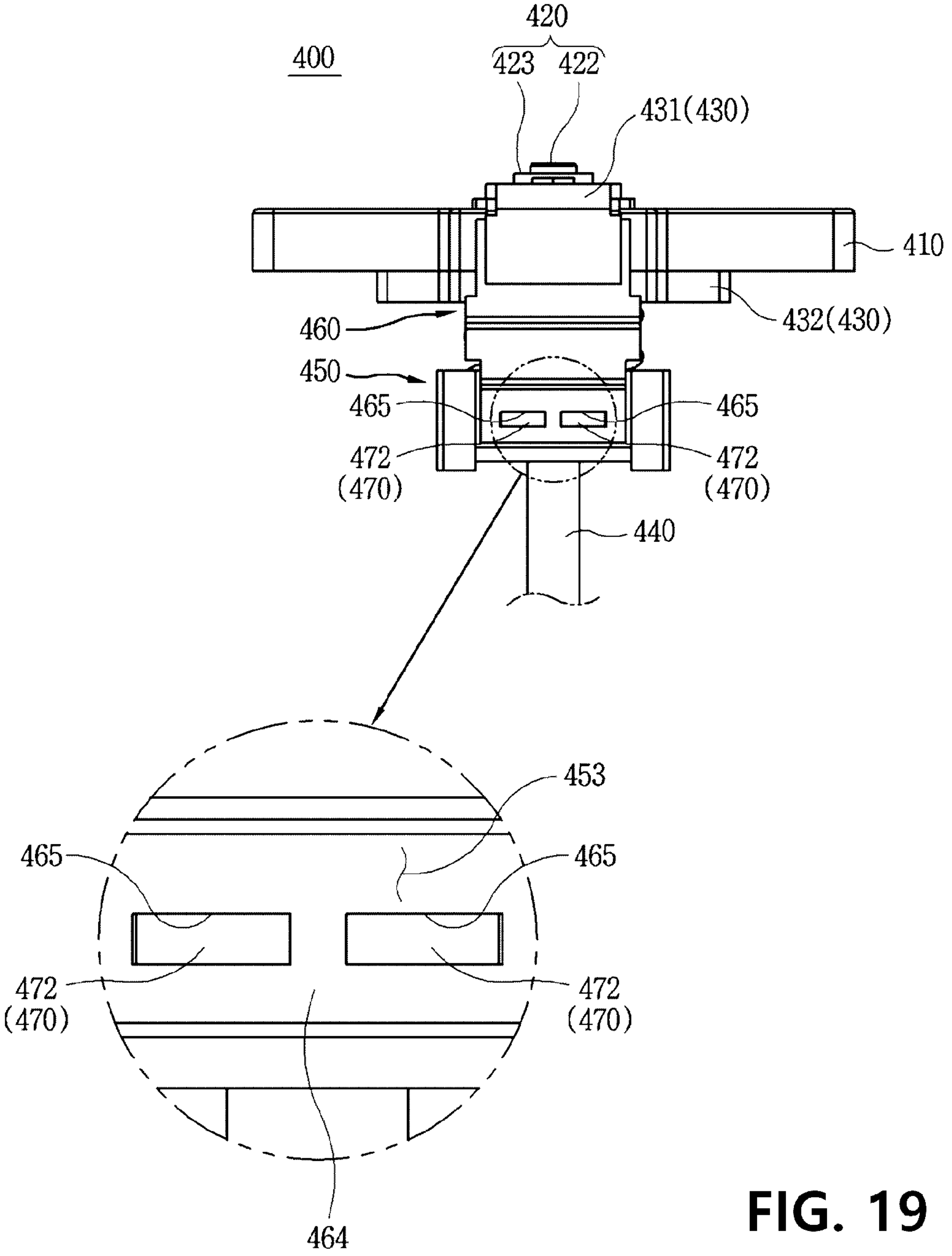
FIG. 19 is a front view illustrating a modified example of the movable contact part of FIG. 4.

In the embodiment shown in FIG. 19, the coupling protrusion 472 is provided in a plurality of rectangular plate shapes having an extension length in the left-right direction longer than an extension length in the front-rear direction and a thickness in the vertical direction.

In the above embodiment, a plurality of coupling protrusions 472 are provided in each coupling space part 453 in the front-rear direction, respectively. In this case, it will be understood that the extension length of each coupling protrusion 472 in the left and right direction is shorter than the extension length of the coupling protrusion 472 in the left and right direction according to the embodiment shown in FIGS. 4 to 18.

In addition, the plurality of coupling protrusions 472 are spaced apart from each other in a width direction, that is, in a left and right direction in the illustrated embodiment, and are positioned side by side. In the above embodiment, the position of each coupling protrusion 472 in the vertical direction may be the same.

In this case, the coupling groove 465 formed in the coupling part 464 of the upper holder 460 is also changed according to the number, shape, and positional relationship of the coupling protrusion 472.

That is, in the embodiment shown in FIG. 19, the coupling groove 465 also has a cross-sectional shape in which the extension length in the left and right direction is longer than the extension length in the vertical direction. In addition, in the above embodiment, a plurality of coupling grooves 465 are provided and are positioned to be spaced apart from each other in the left and right direction.

Figure 20:
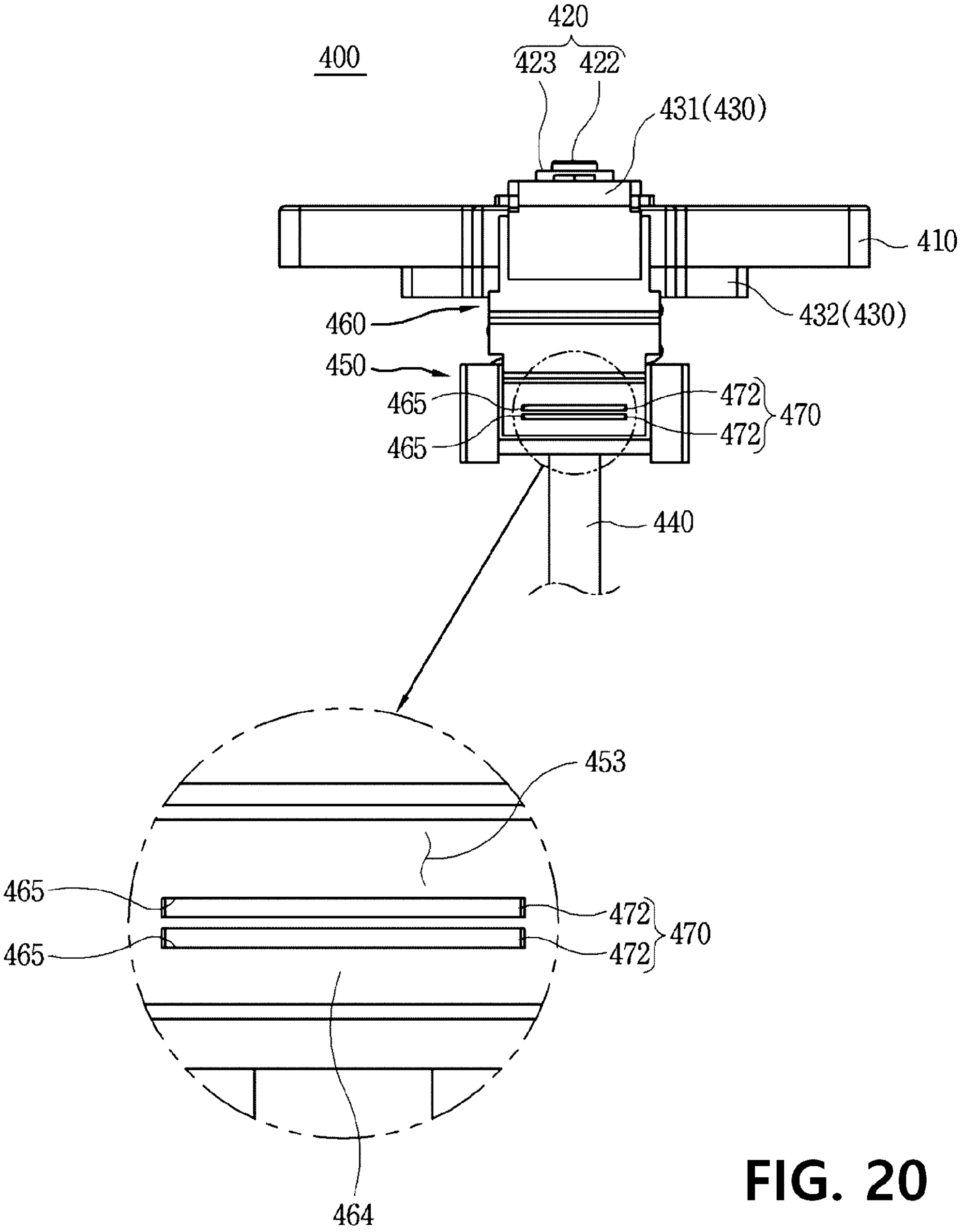
FIG. 20 is a front view illustrating another modified example of the movable contact part of FIG. 4.

In the embodiment shown in FIG. 20, the coupling protrusion 472 is provided in a plurality of rectangular plate shapes having an extension length in the left-right direction longer than an extension length in the front-rear direction and a thickness in the vertical direction.

In the above embodiment, a plurality of coupling protrusions 472 are provided in each coupling space part 453 in the front-rear direction, respectively. In this case, it will be understood that the length of each coupling protrusion 472 in the vertical direction, that is, the thickness, is thinner than the thickness of the coupling protrusion 472 according to the embodiment shown in FIGS. 4 to 18.

In addition, the plurality of coupling protrusions 472 are spaced apart from each other in a thickness direction, that is, in the vertical direction in the illustrated embodiment, and are positioned side by side. In the above embodiment, the position of each coupling protrusion 472 in the left-right direction may be the same.

In this case, the coupling groove 465 formed in the coupling part 464 of the upper holder 460 is also changed according to the number, shape, and positional relationship of the coupling protrusion 472.

That is, in the embodiment shown in FIG. 20, the coupling groove 465 also has a cross-sectional shape in which the extension length in the left-right direction is longer than the extension length in the vertical direction, but the length in the vertical direction is shorter than that of the embodiment shown in FIGS. 4 to 18.

In addition, in the above embodiment, a plurality of coupling grooves 465 are provided and are positioned to be spaced apart from each other in the vertical direction.

Figure 21:
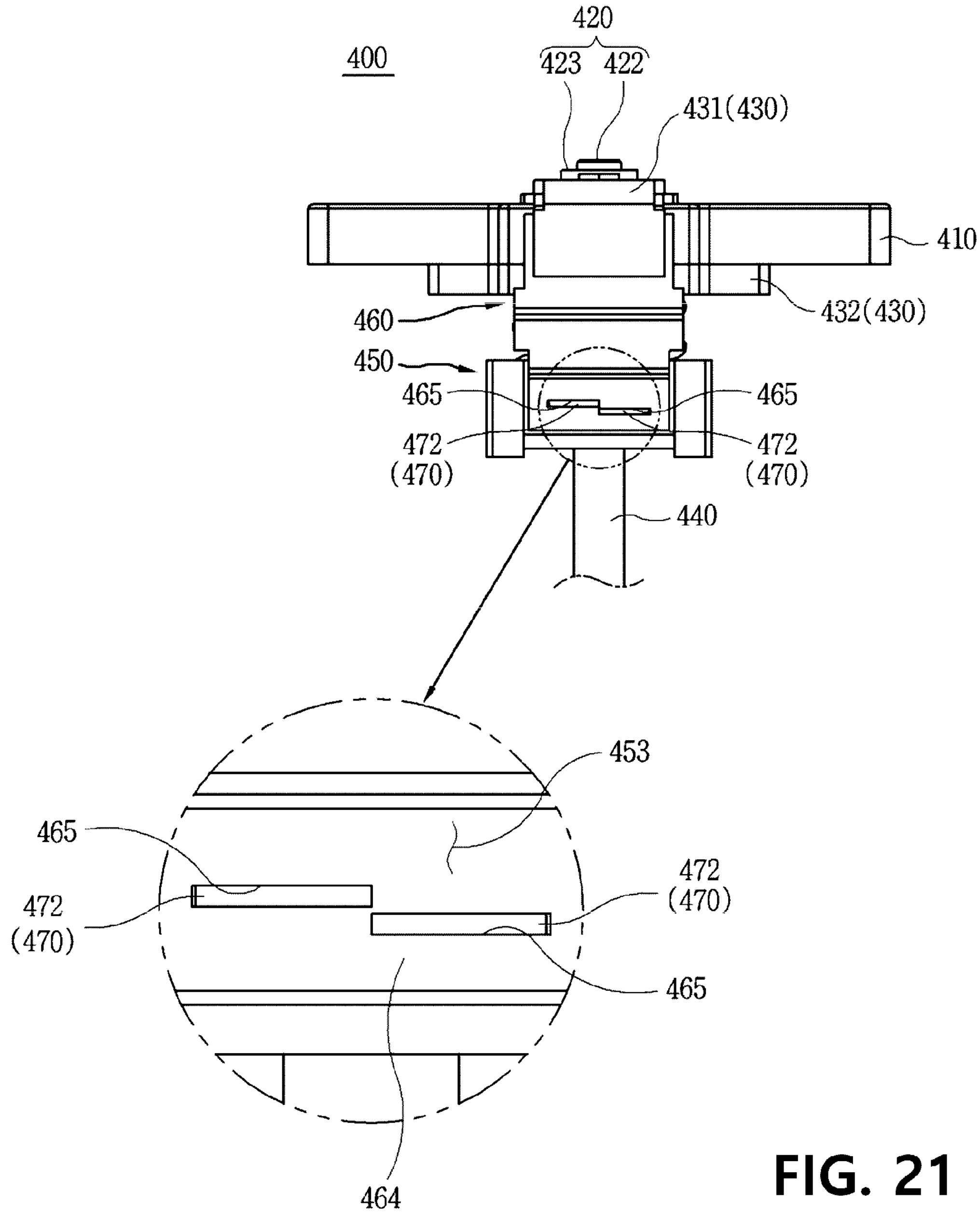
FIG. 21 is a front view illustrating still another modified example of the movable contact part of FIG. 4.

In the embodiment shown in FIG. 21, the coupling protrusion 472 is provided in a plurality of rectangular plate shapes having an extension length in the left-right direction longer than an extension length in the front-rear direction and a thickness in the vertical direction.

In the above embodiment, a plurality of coupling protrusions 472 are provided in each coupling space part 453 in the front-rear direction, respectively. In this case, it will be understood that the length of each coupling protrusion 472 in the left-right direction, and the length in the vertical direction, that is, the thickness is thinner than the thickness of the coupling protrusion 472 according to the embodiment shown in FIGS. 4 to 18.

In addition, the plurality of coupling protrusions 472 are spaced apart from each other in a thickness direction, that is, in the left-right direction and vertical direction in the illustrated embodiment, and are positioned side by side. That is, in the above embodiment, each coupling protrusion 472 is disposed to be spaced apart with each other inclined toward the upper left side and the lower right side.

In this case, the coupling groove 465 formed in the coupling part 464 of the upper holder 460 is also changed according to the number, shape, and positional relationship of the coupling protrusion 472.

That is, in the embodiment shown in FIG. 21, the coupling groove 465 also has a cross-sectional shape in which the extension length in the left-right direction is longer than the extension length in the vertical direction, but the length in the vertical direction is shorter than that of the embodiment shown in FIGS. 4 to 18.

Likewise, it will be understood that the length of the coupling groove 465 in the vertical direction is also shorter than that of the embodiment shown in FIGS. 4 to 18.

In addition, in the above embodiment, a plurality of coupling grooves 465 are provided, and like the arrangement of the coupling protrusion 472, are disposed to be spaced apart with each other inclined toward the upper left side and the lower right side.

Figure 22:
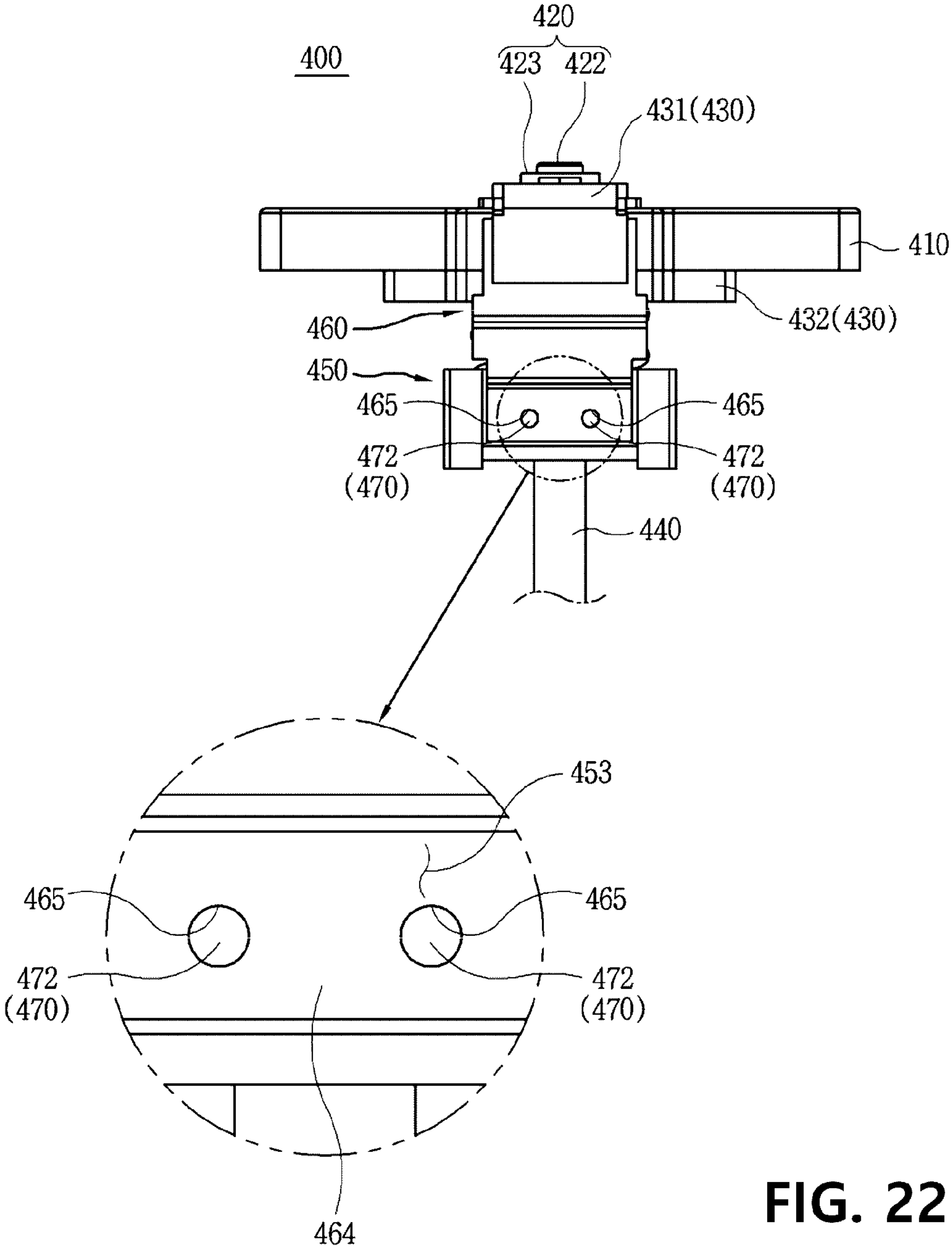
FIG. 22 is a front view illustrating still another modified example of the movable contact part of FIG. 4.

In the embodiment shown in FIG. 22, the coupling protrusion 472 has a cross-section formed with a predetermined diameter and is provided in a plurality of cylindrical shapes extending in the front-rear direction.

In the above embodiment, a plurality of coupling protrusions 472 are provided in each coupling space part 453 in the front-rear direction, respectively. In this case, it will be understood that the diameter of each coupling protrusion 472 is shorter than the extension length of the coupling protrusion 472 in the left and right direction according to the embodiment shown in FIGS. 4 to 18.

In addition, the plurality of coupling protrusions 472 are spaced apart from each other in a width direction of the coupling space part 453, that is, in a left and right direction in the illustrated embodiment, and are positioned side by side. In the above embodiment, the position of each coupling protrusion 472 in the vertical direction may be the same.

In this case, the coupling groove 465 formed in the coupling part 464 of the upper holder 460 is also changed according to the number, shape, and positional relationship of the coupling protrusion 472.

That is, in the embodiment shown in FIG. 22, the coupling groove 465 also has a circular cross-section. In addition, in the above embodiment, a plurality of coupling grooves 465 are provided and are positioned to be spaced apart from each other in the left and right direction.

Accordingly, it will be understood that the shape, position, and arrangement of the coupling protrusion 472 and the coupling groove 465 may be variously configured.

In an embodiment in which a plurality of coupling protrusions 472 and a plurality of coupling grooves 465 are provided, the upper holder 460 and the lower holder 470 may be coupled at a plurality of positions. Accordingly, the coupling state between the upper holder 460 and the lower holder 470 may be more stably maintained.

4. Description of the Movable Contact Part (500) According to Another Embodiment of the Present Disclosure Referring back to FIGS. 2 and 3, the direct current relay 10 according to an embodiment of the present disclosure includes a movable contact part 500.

The function and structure of the movable contact part 500 according to the present embodiment correspond to the movable contact part 400 according to the above-described embodiment. However, the movable contact part 500 according to the present embodiment is different from the movable contact part 400 according to the above-described embodiment in some components.

Specifically, the movable contact part 500 according to the present embodiment is different from the movable contact part 400 according to the above-described embodiment in that the coupling protrusion 565 formed in the upper holder 560 is inserted into and coupled to the coupling groove 572 formed in the lower holder 570.

Figure 24:
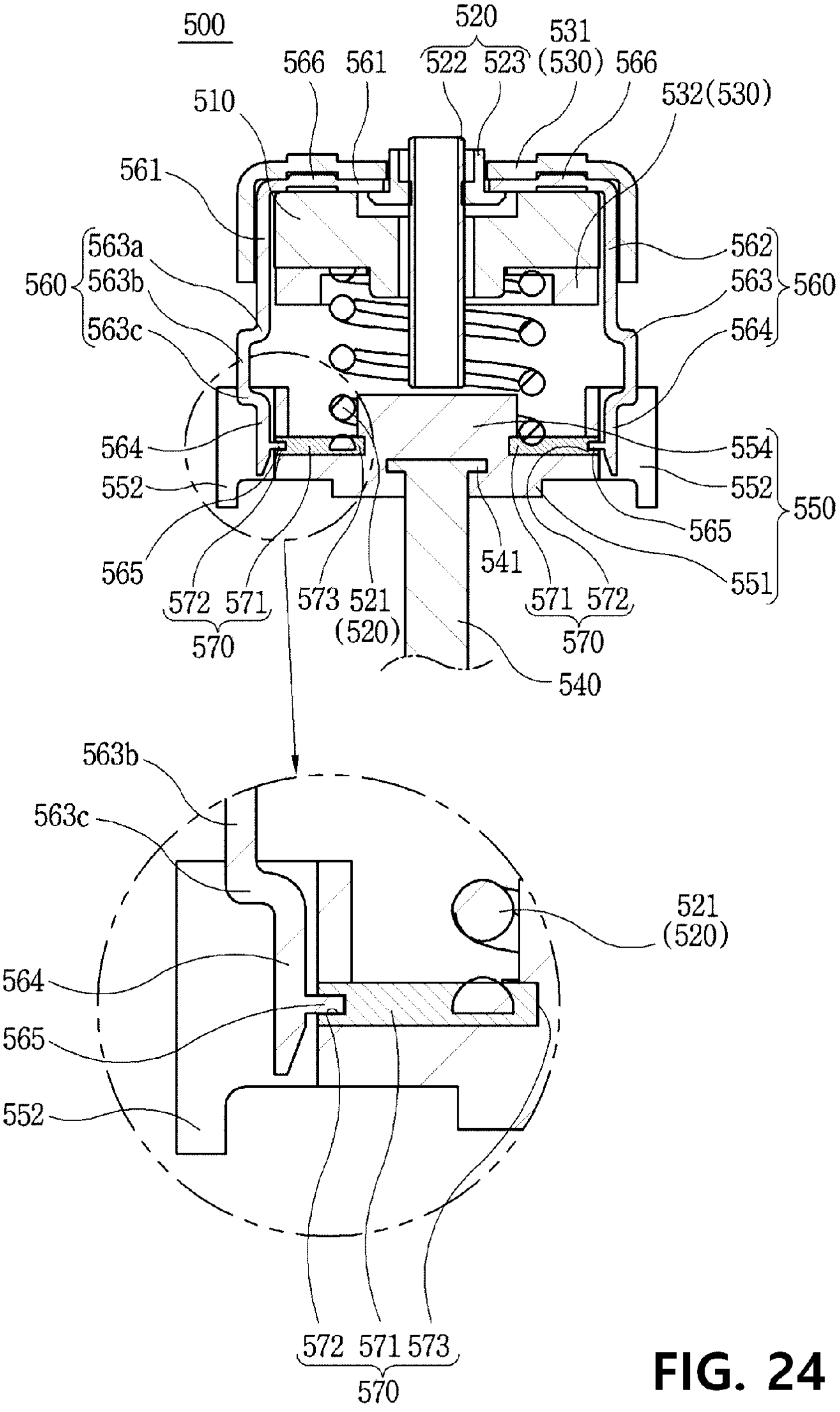
FIG. 24 is a side cross-sectional view illustrating the movable contact part according to the exemplary embodiment of FIG. 23.

Hereinafter, the movable contact part 500 according to the present embodiment will be described with reference to FIGS. 23 and 24, focusing on differences from the movable contact part 400 according to the above-described embodiment.

In the illustrated embodiment, the movable contact part 500 includes a movable contact 510, a support part 520, a yoke part 530, a shaft 540, a housing 550, an upper holder 560, and a lower holder 570.

Among the above components, the movable contact 510, the support part 520, the yoke part 530 and the shaft 540 have the same structure, function, and coupling structure as the movable contact 410, the support part 420, the yoke part 430, and the shaft 440 according to the above-described embodiment.

The housing 550 has substantially the same structure and function as the housing 450 according to the above-described embodiment. However, the housing 550 according to the present embodiment has a difference in that a groove communicating with the space in which the lower holder 570 is accommodated and the coupling space part 553 is formed.

That is, the housing 550 according to the present embodiment a groove functioning as a passage through which the coupling protrusion 565 of the upper holder 560 is inserted into the coupling groove 572 of the lower holder 570.

The groove is formed inside the housing 550 and communicates with the space in which the lower holder 570 is accommodated and the coupling space part 553. Accordingly, the coupling protrusion 565 of the upper holder 560 accommodated in the coupling space part 553 may be inserted into the coupling groove 572 of the lower holder 570 via the groove.

The shape of the groove may be formed to correspond to the shapes of the coupling protrusion 565 and the coupling groove 572. In the illustrated embodiment, the groove extends in the left and right directions and has a rectangular cross-section having a predetermined thickness in the vertical direction. In addition, the groove is formed recessed in a direction opposite to the coupling space part 513, that is, in a direction toward the lower holder 570.

The upper holder 560 has substantially the same structure and function as the upper holder 460 according to the above-described embodiment. However, the difference is that the upper holder 560 according to the present embodiment includes a coupling protrusion 565 inserted into and coupled to the lower holder 570.

That is, in the present embodiment, in the coupling part 564 of the upper holder 560, a coupling groove is not formed through and a coupling protrusion 565 protruding in a direction toward the lower holder 570 is provided.

The coupling protrusion 565 passes through the groove formed in the housing 550 and is inserted into and coupled to the coupling groove 572 formed in the lower holder 570. In this case, it will be understood that the coupling part 564 may be deformed and restored and the coupling protrusion 565 may be inserted into the coupling groove 572.

The coupling protrusion 565 may be formed to correspond to the shape and location of the coupling groove 572. In the illustrated embodiment, the coupling protrusion 565 has a rectangular cross-section with a length extending in the left-right direction longer than that in the vertical direction, and has a quadrangular column shape extending toward the lower holder 570.

The lower holder 570 has substantially the same structure and function as the lower holder 470 according to the above-described embodiment. However, the difference is that the lower holder 570 according to the present embodiment includes a coupling groove 572 into which the coupling protrusion 565 of the upper holder 560 is inserted and coupled.

That is, in the present embodiment, in the lower holder 570, a coupling protrusion partially exposed to the coupling space part 553 is not provided, but a coupling groove 572 into which the coupling protrusion 565 of the upper holder 560 is inserted is provided.

The coupling groove 572 is formed recessed in the longitudinal direction of the flat plate part 571 of the lower holder 570. In other words, the coupling groove 572 is formed recessed at each end of the flat plate part 571 in the longitudinal direction, that is, in the front side and the rear side in the illustrated embodiment.

Accordingly, it may be said that the coupling groove 572 is formed recessed in a direction opposite to the coupling protrusion 565.

The coupling groove 572 communicates with the groove formed in the housing 550. Also, the coupling groove 572 communicates with the coupling space part 553. Accordingly, the coupling protrusion 565 may pass through the groove and be inserted into the coupling groove 572.

The coupling groove 572 may be formed to correspond to the shape and location of the coupling protrusion 565. In the illustrated embodiment, the coupling groove 572 has a rectangular cross-section with a length extending in the left-right direction longer than that in the vertical direction, and is formed recessed in a direction opposite to the coupling protrusion 565.

Although not shown, it will be understood that, like the movable contact part 400 according to the above-described embodiment, the shape, number, and arrangement of the coupling protrusion 565 and the coupling groove 572 may be changed.

Although the above has been described with reference to preferred embodiments of the present disclosure, it will be understood that those skilled in the art can variously modify and change the present disclosure without departing from the spirit and scope of the present disclosure described in the claims below.

DESCRIPTION OF SYMBOLS

10: direct current relay
100: frame part
110: upper frame
120: lower frame
130: insulating plate
140: support plate
200: switch part
210: arc chamber
220: fixed contact
220*a*: first fixed contact
220*b*: second fixed contact
230: sealing member
300: core part
310: stationary core
320: bottom part
330: yoke
340: bobbin
350: coil
360: cylinder
370: movable core
380: elastic part
400: movable contact part according to an embodiment of the present disclosure
410: movable contact
411: insertion groove
412: insertion hole
420: support part
421: spring
422: insertion pin
423: support pin
430: yoke part
431: upper yoke
432: lower yoke
440: shaft
441: head part
450: housing
451: body part
452: arm part
453: coupling space part
454: support protrusion
460: upper holder
461: base
462: connection part
463: cushioning part
463*a*: first bent part
463*b*: second bent part
463*c*: third bent part
464: coupling part
465: coupling groove
466: fitting protrusion
467: through opening
470: lower holder
471: flat plate part
472: coupling protrusion
473: opening
500: movable contact part according to another embodiment of the present disclosure
510: movable contact
511: insertion groove
512: insertion hole
520: support part
521: spring
522: insertion pin
523: support pin
530: yoke part
531: upper yoke
532: lower yoke
540: shaft
541: head part
550: housing
551: body part
552: arm part
553: coupling space part
554: support protrusion
560: upper holder
561: base
562: connection part
563: bent part
563*a*: first bent part
563*b*: second bent part
563*c*: third bent part
564: coupling part
565: coupling protrusion
566: fitting protrusion
567: through opening
570: lower holder
571: flat plate part
572: coupling groove
573: opening

What is claimed is:

1. A movable contact part, comprising:

a movable contact;

an upper holder surrounding the movable contact at a first side;

a housing positioned to face the upper holder with the movable contact interposed therebetween, and surrounding the movable contact at a second side opposite to the first side; and a lower holder located inside the housing, partially exposed to an exterior of the housing and coupled to the upper holder;

wherein a first one of the upper holder and the lower holder is provided with a coupling protrusion protruding toward a second one of the upper holder and the lower holder, a coupling groove accommodating the coupling protrusion is formed in the second one of the upper holder and the lower holder, and wherein the upper holder comprises:

a base, extending in a first direction to a first side and a second direction, opposite to the first direction, to a second side;

a first connection part, extending continuously from the first side of the base in a third direction toward the lower holder;

a second connection part, extending continuously from the second side of the base in the third direction toward the lower holder, wherein the base, the first connection part, and the second connection part surround the movable contact on three sides; and a first cushioning part continuous with the first connection part, extending toward the lower holder, and formed to protrude further in the first direction compared to the first connection part to cushion an external force, a second cushioning part continuous with the second connection part, extending toward the lower holder, and formed to protrude further in the second direction compared to the second connection part to cushion the external force, wherein the first cushioning part comprises:

a first bend part extending obliquely from the first connection part in the first direction;

a second bend part extending at a second predetermined angle with respect to the first bend part; and a third bend part extending obliquely from the second bend part in the second direction;

wherein the lower holder comprises:

a flat plate part located inside the housing, extending in the first direction to a first end and the second direction to a second end, and having the coupling protrusion formed at the first end;

wherein the upper holder comprises:

a first coupling part that is continuous with the first cushioning part, extends toward the lower holder, has the coupling groove formed therein, and defines a third coupling groove in addition to the coupling groove;

a second coupling part that is continuous with the second cushioning part, extends toward the lower holder, has a second coupling groove formed therein, and defines a fourth coupling groove in addition to the second coupling groove, such that the coupling groove, the second coupling groove, the third coupling groove, and the fourth coupling groove are members of a plurality of coupling grooves; and wherein the lower holder comprises:

a second coupling protrusion formed at a second end of the flat plate part in the second direction, such that the coupling protrusion and the second coupling protrusion are members of a plurality of coupling protrusions, wherein the plurality of coupling protrusions positioned at any one end of the flat plate part are coupled to the plurality of coupling grooves provided in coupling part of the first coupling part and the second coupling part; and wherein:

each of the first coupling part and the second coupling part is formed to have a width in a fourth direction, the plurality of coupling grooves provided in any one coupling part of the first coupling part and the second coupling part are spaced apart from each other in the fourth direction, and the plurality of coupling protrusions located at any one end of each end of the flat plate part are spaced apart from each other in the fourth direction.

2. The movable contact part of claim 1, wherein:

the housing comprises:

a body part accommodating the lower holder;

a plurality of arm parts located on one side facing the coupling part, connected to the body part, and spaced apart from each other in the second direction; and a coupling space part formed surrounded by the body part and the plurality of arm parts and accommodating the first coupling part.

3. The movable contact part of claim 2, wherein:

the plurality of arm parts are spaced apart by a length equal the width of the coupling part, and each end in the second direction of the coupling part accommodated in the coupling space part is supported by the plurality of arm parts.

4. A direct current relay, comprising:

a fixed contact electrically connected to an external power source or load;

a movable contact positioned below the fixed contact and coming into contact with and spaced apart from the fixed contact;

an upper holder positioned between the movable contact and the fixed contact and surrounding an upper side of the movable contact;

a housing located below the movable contact and surrounding a lower side of the movable contact; and a lower holder located inside the housing, partially exposed to an exterior of the housing and coupled to the upper holder;

wherein a first one of the upper holder and the lower holder is provided with a coupling protrusion protruding toward a second one of the upper holder and the lower holder, a coupling groove accommodating the coupling protrusion is formed in the second one of the upper holder and the lower holder, and wherein the upper holder comprises:

a base, extending in a first direction to a first side and a second direction, opposite to the first direction, to a second side;

a first connection part, extending continuously from the first side of the base in a third direction toward the lower holder;

a second connection part, extending continuously from the second side of the base in the third direction toward the lower holder, wherein the base, the first connection part, and the second connection part surround the movable contact on three sides;

a first cushioning part continuous with the first connection part, extending toward the lower holder, and formed to protrude further along the first direction compared to the first connection part to cushion an external force, and a second cushioning part continuous with the second connection part, extending toward the lower holder, and formed to protrude further along the second direction compared to the second connection part to cushion the external force, wherein the first cushioning part comprises:

a first bend part extending obliquely from the first connection part in the first direction;

a second bend part extending at a second predetermined angle with respect to the first bend part; and a third bend part extending obliquely from the second bend part in the second direction, wherein the lower holder comprises:

a flat plate part located inside the housing, extending in the first direction to a first end and the second direction to a second end, and having the coupling protrusion formed at the first end;

wherein the upper holder comprises:

a first coupling part that is continuous with the first cushioning part, extends toward the lower holder, has the coupling groove formed therein, and defines a third coupling groove in addition to the coupling groove;

a second coupling part that is continuous with the second cushioning part, extends toward the lower holder, has a second coupling groove formed therein, and defines a fourth coupling groove in addition to the second coupling groove, such that the coupling groove, the second coupling groove, the third coupling groove, and the fourth coupling groove are members of a plurality of coupling grooves; and wherein the lower holder comprises:

a second coupling protrusion formed at a second end of the flat plate part in the second direction, such that the coupling protrusion and the second coupling protrusion are members of a plurality of coupling protrusions, wherein the plurality of coupling protrusions positioned at any one end of the flat plate part are coupled to the plurality of coupling grooves provided in coupling part of the first coupling part and the second coupling part; and wherein:

each of the first coupling part and the second coupling part is formed to have a width in a fourth direction, the plurality of coupling grooves provided in any one coupling part of the first coupling part and the second coupling part are spaced apart from each other in the fourth direction, and the plurality of coupling protrusions located at any one end of each end of the flat plate part are spaced apart from each other in the fourth direction.

5. The direct current relay of claim 4, wherein:

the upper holder comprises:

a first coupling part that is continuous with the first cushioning part, extends toward the lower holder, and has the coupling groove formed therein; and the lower holder comprises:

a flat plate part located inside the housing, extending in the first direction to a first end and the second direction to a second end, and having the coupling protrusion formed at the first end.

6. The direct current relay of claim 4, wherein:

the housing comprises:

a body part accommodating the lower holder;

a plurality of arm parts located on one side facing the first coupling part, connected to the body part, and spaced apart from each other by the width of the first coupling part in the third direction; and a coupling space part formed surrounded by the body part and the plurality of arm parts and accommodating the first coupling part, wherein each end of the first coupling part accommodated in the coupling space part is supported by the plurality of arm parts.

* * * * *